(12) United States Patent
Lei et al.

(10) Patent No.: US 12,549,780 B2
(45) Date of Patent: Feb. 10, 2026

(54) LIVE INTERACTIVE METHOD AND APPARATUS, DEVICE, AND STORAGE MEDIUM

(71) Applicant: Tencent Technology (Shenzhen) Company Limited, Shenzhen (CN)

(72) Inventors: Danxiong Lei, Shenzhen (CN); Qiang Lu, Shenzhen (CN); Pengju Chen, Shenzhen (CN); Jiangwei Qiu, Shenzhen (CN); Nan Zhan, Shenzhen (CN); Ye Zhang, Shenzhen (CN); Ting Yang, Shenzhen (CN); Hong Qu, Shenzhen (CN); Ziyang Ma, Shenzhen (CN); Tao Liao, Shenzhen (CN); Jie Xiong, Shenzhen (CN); Weizhou Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 223 days.

(21) Appl. No.: 18/241,132

(22) Filed: Aug. 31, 2023

(65) Prior Publication Data

US 2023/0412852 A1 Dec. 21, 2023

Related U.S. Application Data

(63) Continuation of application No. PCT/CN2022/126196, filed on Oct. 19, 2022.

(30) Foreign Application Priority Data

Dec. 10, 2021 (CN) .......................... 202111509530.5

(51) Int. Cl.
*H04N 21/2187* (2011.01)
*G06T 17/00* (2006.01)

(52) U.S. Cl.
CPC .......... *H04N 21/2187* (2013.01); *G06T 17/00* (2013.01)

(58) Field of Classification Search
None
See application file for complete search history.

(56) References Cited

U.S. PATENT DOCUMENTS

| | | | | |
|---|---|---|---|---|
| 2005/0010637 A1* | 1/2005 | Dempski | ................. | H04N 7/15 |
| | | | | 348/E7.083 |
| 2009/0118017 A1* | 5/2009 | Perlman | ................ | A63F 13/335 |
| | | | | 463/42 |

(Continued)

FOREIGN PATENT DOCUMENTS

| | | |
|---|---|---|
| CN | 107766438 A | 3/2018 |
| CN | 109104619 A | 12/2018 |

(Continued)

OTHER PUBLICATIONS

Tencent Technology, WO, PCT/CN2022/126196, Dec. 7, 2022, 4 pgs.

(Continued)

*Primary Examiner* — James R Marandi
(74) *Attorney, Agent, or Firm* — Morgan, Lewis & Bockius LLP

(57) ABSTRACT

A live broadcast interactive method is performed by a computer device. The method includes: displaying a live broadcast picture, the live broadcast picture including a live broadcast interactive role, the live broadcast picture being a live broadcast picture acquired when an anchor account conducts a virtual activity on a first virtual role in a virtual world; and displaying the live broadcast interactive role performing a first interactive action in response to the virtual activity of the first virtual role in the virtual world meeting a trigger condition. In this application, by adding the live broadcast interactive role and connecting the live broadcast (Continued)

interactive role with the first virtual role in the virtual world, interactive modes between the anchor user and the audience user in the process of webcasting are enriched, thus improving interactive efficiency in the process of webcasting.

14 Claims, 14 Drawing Sheets

(56) References Cited

U.S. PATENT DOCUMENTS

2018/0027307 A1    1/2018  Ni et al.
2022/0305390 A1*  9/2022  Tripathi ................ A63F 13/795

FOREIGN PATENT DOCUMENTS

| CN | 111773702 A | 10/2020 |
|---|---|---|
| CN | 112135160 A | 12/2020 |
| CN | 113194329 A | 7/2021 |

OTHER PUBLICATIONS

Tencent Technology, IPRP, PCT/CN2022/126196, Jun. 5, 2024, 5 pgs.

Tencent Technology, ISR, PCT/CN2022/126196, Dec. 7, 2022, 3 pgs.

* cited by examiner

LIVE INTERACTIVE METHOD AND APPARATUS, DEVICE, AND STORAGE MEDIUM

CROSS-REFERENCE TO RELATED APPLICATIONS

This application is a continuation application of PCT Patent Application No. PCT/CN2022/126196, entitled "LIVE INTERACTIVE METHOD AND APPARATUS, DEVICE, AND STORAGE MEDIUM" filed on Oct. 19, 2022, which claims priority to Chinese Patent Application No. 202111509530.5, entitled "LIVE INTERACTIVE METHOD AND APPARATUS, DEVICE, AND STORAGE MEDIUM" filed in China National Intellectual Property Administration on Dec. 10, 2021, all of which is incorporated herein by reference in its entirety.

FIELD OF THE TECHNOLOGY

This application relates to the field of webcast technologies, and in particular, to a live broadcast interactive method and apparatus, a device, and a storage medium.

BACKGROUND OF THE DISCLOSURE

Webcast is a kind of multimedia communication mode which is provided by anchor users to users with an unspecified audience and can be watched in real time.

Audience users can know the live broadcast content of anchor users by watching webcast, and the audience users can interact with the anchor users through text comments.

However, webcast content watched by the audience users is behavior of the anchor users, and the anchor users need to focus on live broadcast content and interact with the audience users at the same time, and thus are under great pressure in livestreaming.

SUMMARY

This application provides a live broadcast interactive method and apparatus, a device, and a storage medium, and technical schemes are as follows.

According to an aspect of an embodiment of the present application, a live broadcast interactive method is performed by a computer device. The method includes:

displaying a live broadcast picture, the live broadcast picture including a live broadcast interactive role, the live broadcast picture being a live broadcast picture acquired when an anchor account conducts a virtual activity on a first virtual role in a virtual world; and displaying the live broadcast interactive role performing a first interactive action in response to the virtual activity of the first virtual role in the virtual world meeting a trigger condition.

According to another aspect of an embodiment of the present application, a live broadcast interactive method is performed by a computer device. The method includes:

displaying a live broadcast picture and a live broadcast interactive role located on the live broadcast picture, the live broadcast picture being a live broadcast picture acquired when an anchor account carries out a competitive game against a first virtual role in a virtual world, the live broadcast interactive role including at least one of: a virtual role set by the anchor account, a virtual role associated with the first virtual role, and a virtual role associated with the first virtual role set by the anchor account;

displaying the live broadcast interactive role performing the second interactive action in response to a role interaction operation triggered on the live broadcast interactive role.

According to another aspect of this application, a computer device is provided, the computer device including a processor and a memory, the memory storing at least one instruction, at least one program, and a code set or an instruction set, the at least one instruction, the at least one program, the code set or the instruction set being loaded and executed by the processor to implement the live broadcast interactive method as described in the above aspects.

According to another aspect of this application, a non-transitory computer-readable storage medium is provided, the storage medium storing at least one instruction, at least one program, and a code set or an instruction set, the at least one instruction, the at least one program, and the code set or the instruction set being loaded and executed by the processor to implement the live broadcast interactive method as described in the above aspects.

According to another aspect of the present application, a computer program product or computer program is provided, which includes computer instructions stored in a non-transitory computer-readable storage medium, and a processor reads and executes the computer instructions from the computer-readable storage medium to implement the live broadcast interactive method as described in the above aspects.

The technical schemes provided in the embodiments of this application have at least the following beneficial effects.

By adding the live broadcast interactive role, the anchor user can interact with the audience user through a live broadcast interactive role in a process of webcasting. The live broadcast interactive role is connected with the first virtual role in the virtual world, which enriches interactive methods between the anchor user and the audience user in the process of webcasting, and the anchor user shares a task of interacting with the audience user with the live broadcast interactive role, thus improving interactive efficiency in the process of webcasting.

DESCRIPTION OF EMBODIMENTS

Figure 1:
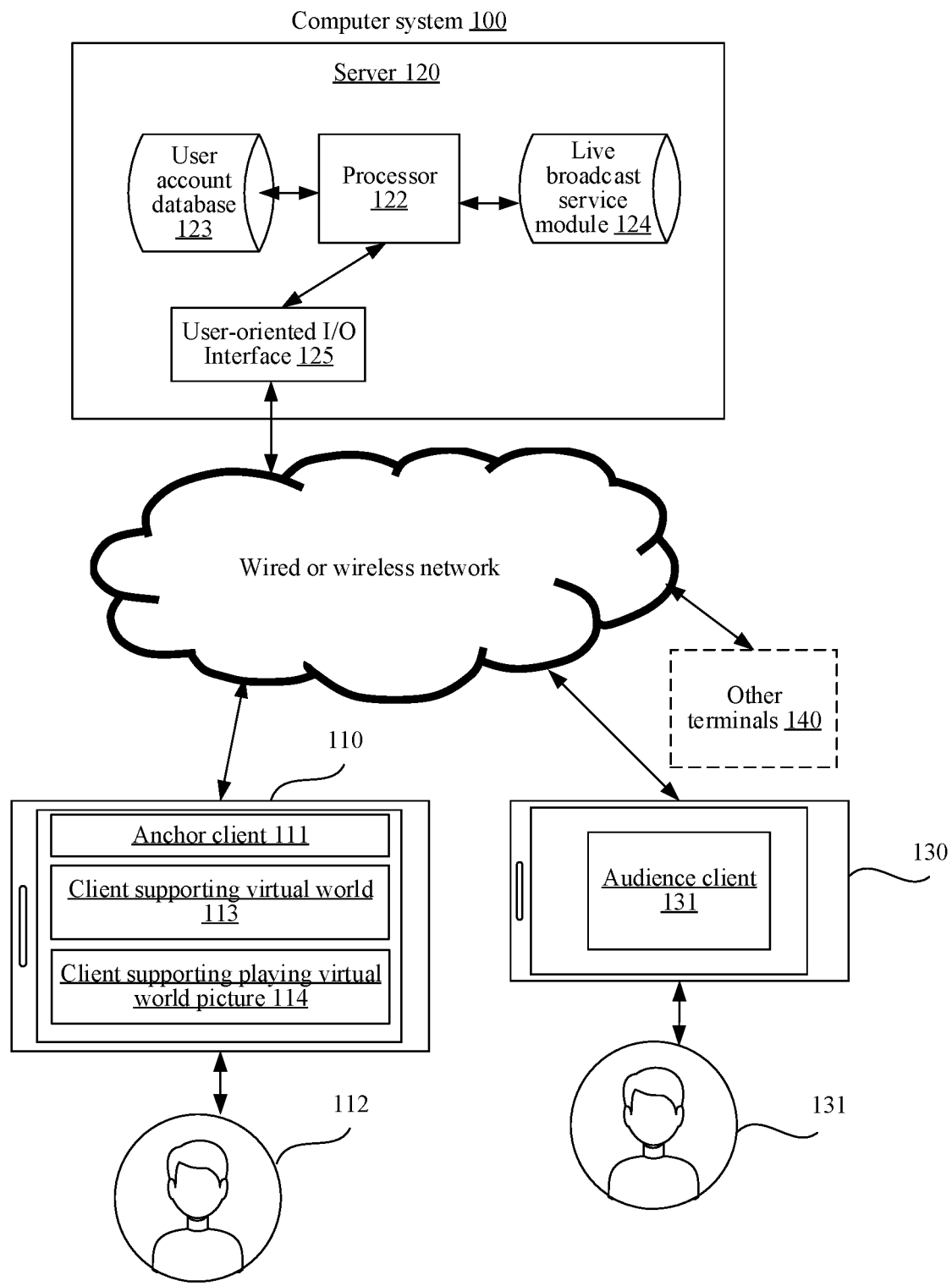
FIG. 1 is a block diagram of a computer system for live broadcast interactive use according to an exemplary embodiment of the present application.

FIG. 1 shows a structural block diagram of a computer system according to an exemplary embodiment of the present application. The computer system 100 includes: a first terminal 110, a server 120, and a second terminal 130.

The first terminal 110 is installed and operated with an anchor client 111 supporting webcasting, which can be a webcast program. When the first terminal 110 runs the anchor client 111 to conduct webcasting activities, a screen of the first terminal 110 displays an interface for the first user 112 to conduct virtual activities, and the first user 112 is an anchor user. In this application, the anchor client 111 can be understood as an anchor user or an anchor account; that is, the anchor user conducts webcasting activities through the anchor client 111, and in conducting the webcasting activities, the anchor client 111 is logged with the anchor account.

The first user 112 conducts virtual activities in an application program provided with a virtual world, and the application program includes but is not limited to any of: a Virtual Reality (VR) application program, an Augmented Reality (AR) program, a virtual reality game, an augmented reality game, a First-Person Shooting Game (FPS), a Third-Personal Shooting Game (TPS), a Multiplayer Online Battle Arena Games (MOBA), and a Simulation Game (SLG).

In this embodiment, the application program of the first user 112 performing virtual activities is a MOBA game for illustration. The first user 112 uses the first terminal 110 to control the first virtual role located in the virtual world to conduct activities, and the first virtual role can be called a virtual role of the first user 112. The first user 112 can control the first virtual role to participate in at least one of the various game modes, which is not limited in this application. Illustratively, the first virtual role is a virtual role, such as a simulated character or a cartoon character. Optionally, in order to support the first user 112 in conducting the virtual activities, the first terminal 110 is installed and operated with a client 113 supporting the virtual world or with a client 114 supporting playing virtual world pictures.

The second terminal 130 is installed and operated with an audience client 131 that supports watching webcasts. Optionally, the audience client 131 and the anchor client 111 may be implemented as a same client or as different clients.

When the second user 131 runs the audience client 131 on the second terminal 130 to watch webcasting activity, a livestreaming interface of the first user 112 is displayed on a screen of the second terminal 130, and the second user 131 is an audience user. In this application, the audience client 131 can be understood as the audience user or an audience account. That is, the audience user watches the webcasting activity through the audience client 131, and in the process of watching the webcasting activity, the audience client 131 is logged with the audience account.

The first terminal 110 may generally refer to one of a plurality of terminals, and the second terminal 130 may generally refer to the another of the plurality of terminals. In this embodiment only the first terminal 110 and the second terminal 130 are taken as examples. Equipment types of the first terminal 110 and the second terminal 130 are the same or different, which include: at least one of a mobile phone, a tablet computer, an ebook reader, a Moving Picture Experts Group Audio Layer III (MP3) player, a Moving Picture Experts Group Audio Layer IV (MP4) player, a laptop, and a desktop computer.

Only two terminals are shown in FIG. 1, but there are a plurality of other terminals 140 that can access the server 120 in different embodiments. Optionally, there are also one or more terminals 140 corresponding to a developer, and a development and editing platform supporting the audience client 131 and/or the anchor client 111 is installed on the terminal 140. The developer can edit and update the audience client 131 and/or the anchor client 111 on the terminal 140, and transmit updated installation packages of the audience client 131 and/or the anchor client 111 to the server 120 through a wired or wireless network. The first terminal 110 and the second terminal 130 can download the installation packages of the audience client 131 and/or the anchor client 111 from the server 120 so as to achieve updating of the audience client 131 and/or the anchor client 111.

The first terminal 110, the second terminal 130 and other terminals 140 are connected to the server 120 through a wireless network or a wired network.

The server 120 includes at least one of a server, a plurality of servers, a cloud computing platform, and a virtualization center. The server 120 is configured to provide background services for the audience client 131 and/or the anchor client 111. Optionally, the server 120 undertakes main computation work, and the terminal undertakes secondary computation work. Alternatively, the server 120 undertakes the secondary computation work and the terminal undertakes the primary computation work. Alternatively, a distributed computing architecture is adopted for the server 120 and the terminal for collaborative computing.

In a schematic example, the server 120 includes a processor 122, a user account database 123, a livestreaming service module 124, and a user-oriented Input/Output Interface (I/O interface) 125. The processor 122 is configured to load instructions stored in the server 121 and process data in the user account database 123 and the livestreaming service module 124. The user account database 123 is configured to store data of user accounts used by the first terminal 110, the second terminal 130, and other terminals 140, such as an avatar of the user account, a nickname of the user account, livestreaming information of the user account and a service area where the user account is located. The livestreaming service module 124 is configured to provide livestreaming services, such as game livestreaming, radio livestreaming, etc. The user-oriented I/O interface 125 is configured to establish communication and exchange data with the first terminal 110 and/or the second terminal 130 through a wireless network or a wired network. In addition, technical schemes of the application can be combined with blockchain technology. For example, in the live broadcast interactive method disclosed in this application, some data involved (such as live broadcast interactive roles, first interactive action, and other data) can be saved on a blockchain.

Figure 2:
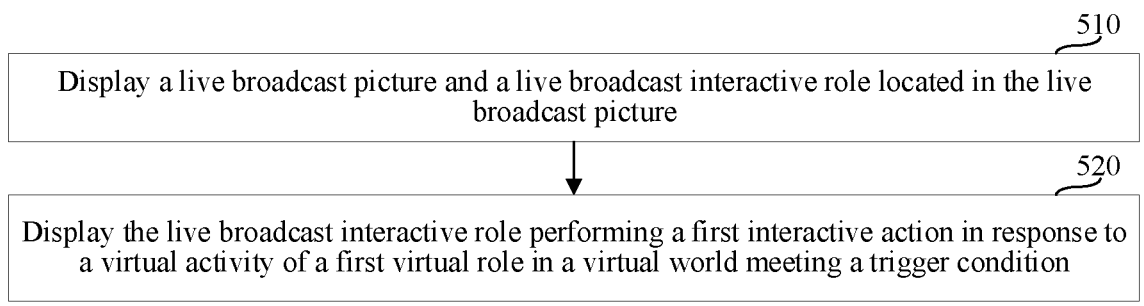
FIG. 2 is a flowchart of a live broadcast interactive method according to an exemplary embodiment of the present application.

FIG. 2 shows a flowchart of a live broadcast interactive method according to an exemplary embodiment of the present application. The method can be executed by a terminal at an audience user side and can be applied to the audience client. This method includes:

Step 510: Display a live broadcast picture and a live broadcast interactive role located on the live broadcast picture.

For example, at least one of the live broadcast picture, a virtual activity event stream and a voice stream transmitted by an anchor client is obtained, and model data and a model identifier of the live broadcast interactive role can be transmitted by the anchor client alone or transmitted in at least one of the above information.

The live broadcast picture is a live broadcast picture acquired when the anchor account conducts the virtual activity on the first virtual role in the virtual world. Taking a virtual world provided by a game client as an example, the game client is a world for the first virtual role to conduct a virtual activity. The game client can be a client that supports the virtual world or a client that supports playing virtual world pictures. The first virtual role is a virtual role displayed and/or controlled by the anchor user.

It is to be understood that, an account that controls the first virtual role in the virtual world can be the anchor account or other accounts, and other accounts are usually game accounts corresponding to the virtual world. The live broadcast picture is a virtual activity picture acquired by the anchor client logged with the anchor account. For example, the anchor account acquires a first picture according to settings of the anchor user, and the first picture is a picture of the first virtual role conducting the virtual activity in the virtual world.

When the live broadcast picture and live broadcast interactive role are displayed in the audience client, a display level of the live broadcast interactive role is different from a display level of the live broadcast picture. That is, the live broadcast interactive role can be displayed independently of the live broadcast picture. For example, the live broadcast interactive role is usually rendered at the audience client. When the live broadcast interactive role is rendered, there's no need to use information in the live broadcast picture, and the live broadcast interactive role can be rendered with the model data and the model identifier of the live broadcast interactive role. The model data of the live broadcast interactive role is configured to describe the appearance of the live broadcast interactive role, and the model identifier of the live broadcast interactive role is configured to indicate a form of the live broadcast interactive role that needs to be displayed. For example, the live broadcast interactive role is a virtual role generated based on a three-dimensional model. The audience client acquires a three-dimensional model corresponding to the model identifier, and then renders the three-dimensional model based on the model data of the live broadcast interactive role to generate and display a three-dimensional live broadcast interactive role.

Illustratively, the display level of live broadcast interactive role is usually above a display level of the live broadcast picture, and it can also be described that the display level of the live broadcast interactive role is higher than the display level of the live broadcast picture. However, it is not excluded that the display level of the interactive role is lower than the display level of the live broadcast picture, that is, there may be a case where the display level of the live broadcast interactive role is not higher than the display level of the live broadcast picture. Optionally, the live broadcast interactive role has a transparency parameter, and the audience user can set the transparency parameter at the audience client. Optionally, the live broadcast picture and the live broadcast interactive role are rendered separately. That is, the live broadcast picture can be independently rendered according to relevant information of the live broadcast picture. According to the relevant information of the live broadcast interactive role, the live broadcast interactive role is rendered separately. Illustratively, the above rendering process can be performed at the same time, and no restriction is made on a timing relationship of the rendering processes in this embodiment.

Step 520: Display the live broadcast interactive role performing the first interactive action in response to the virtual activity of the first virtual role in the virtual world meeting a trigger condition.

In the embodiment of the application, the virtual activity of the first virtual role in the virtual world includes but is not limited to at least one of: adjusting body posture, crawling, walking, running, riding, jumping, driving, picking up, shooting, attacking, throwing and confronting.

The trigger condition is used to instruct the live broadcast interactive role to perform the first interactive action. The trigger condition may be that the first virtual role performs the virtual activity in the virtual world. It can also be an event caused by the first virtual role performing virtual activities in the virtual world.

The first interactive action is an interactive action executed by the live broadcast interactive role and interacting with the audience user. For example, the first interactive action is a three-dimensional interactive action corresponding to the trigger condition, and the three-dimensional interactive action includes but is not limited to at least one of: performing an action conforming to a first gesture, speaking a first voice, playing a first expression, and changing a position on the live broadcast picture.

For example, when the virtual activity of the first virtual role in the virtual world meets the trigger condition, the first action data of the first interactive action is acquired, and the first action data is data instructing parts of the three-dimensional model of the live broadcast interactive role to perform actions. The three-dimensional model of the live broadcast interactive role is controlled to execute the first interactive action based on the first action data.

For example, the first interactive action is to perform the action conforming to the first posture, the action data of the first posture is acquired, and the three-dimensional model of the live broadcast interactive role is controlled to complete the first posture based on action data of the first posture.

For example, the first interactive action is to speak the first voice and pitch information of a voice stream of the first voice is acquired. Mouth shape data of the live broadcast interactive role is determined according to the pitch information. Based on the mouth shape data, a mouth part of the three-dimensional model of the live broadcast interactive role is controlled to perform opening and closing actions, and the voice stream of the first voice is played. For the determination of a mouth shape, a sum of pitch information in the first period can be calculated periodically. A first pitch threshold interval corresponding to the sum of the pitch information is determined among n pitch threshold intervals. A mouth shape corresponding to the first pitch threshold interval is queried in a mouth shape correspondence as a mouth shape of the live broadcast interactive role, and the mouth shape correspondence includes correspondences between the n pitch threshold intervals and m mouth shapes.

For example, the first interactive action is to play the first expression, and acquire the expression data of the first expression, and control a face of the three-dimensional model of the live broadcast interactive role to perform the expression action based on the first expression data.

For example, the first interactive action is to change the position on the live broadcast picture, motion data of the live broadcast interactive role is acquired, legs and feet of the three-dimensional model of the live broadcast interactive role are controlled to perform a walking action, a jumping action or a running action based on the motion data, and arm parts of the three-dimensional model of the live broadcast interactive role are controlled to perform a swinging action to move the position on the live broadcast picture.

To sum up, in the method provided in this embodiment, by adding the live broadcast interactive role, the anchor user can interact with the audience user through a live broadcast interactive role in a process of webcasting. The live broadcast interactive role is connected with the first virtual role in the virtual world, which enriches interactive methods between the anchor user and the audience user in the process of webcasting, and the anchor user shares a task of interacting with the audience user with the live broadcast interactive role, thus improving interactive efficiency in the process of webcasting.

Figure 3:
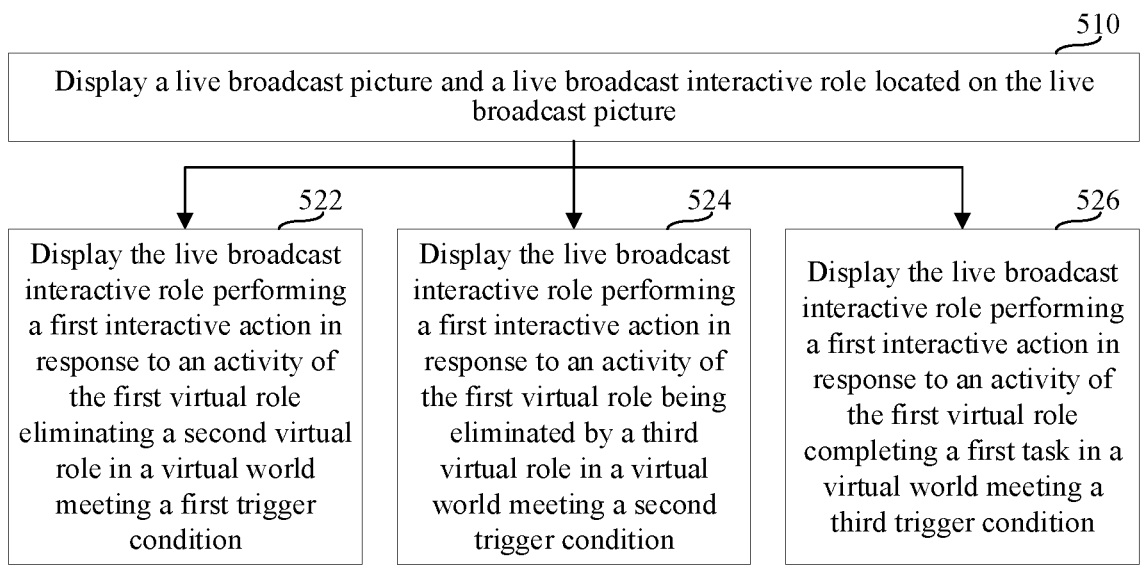
FIG. 3 is a flowchart of a live broadcast interactive method according to an exemplary embodiment of the present application.

FIG. 3 shows a flowchart of a live broadcast interactive method according to an exemplary embodiment of the present application. The method may be executed by a computing device and can be applied to the audience client. This method includes:

Step 510: Display a live broadcast picture and a live broadcast interactive role located on the live broadcast picture.

The live broadcast picture is a live broadcast picture acquired when an anchor account conducts a virtual activity on the first virtual role in a virtual world, and a display level of the live broadcast interactive role is different from a display level of the live broadcast picture. When the live broadcast interactive role is rendered, there's no need to use information in the live broadcast picture, and the live broadcast interactive role can be rendered with the model data and the model identifier of the live broadcast interactive role. The model data of the live broadcast interactive role is configured to describe the appearance of the live broadcast interactive role, and the model identifier of the live broadcast interactive role is configured to indicate a form of the live broadcast interactive role that needs to be displayed.

Figure 4:
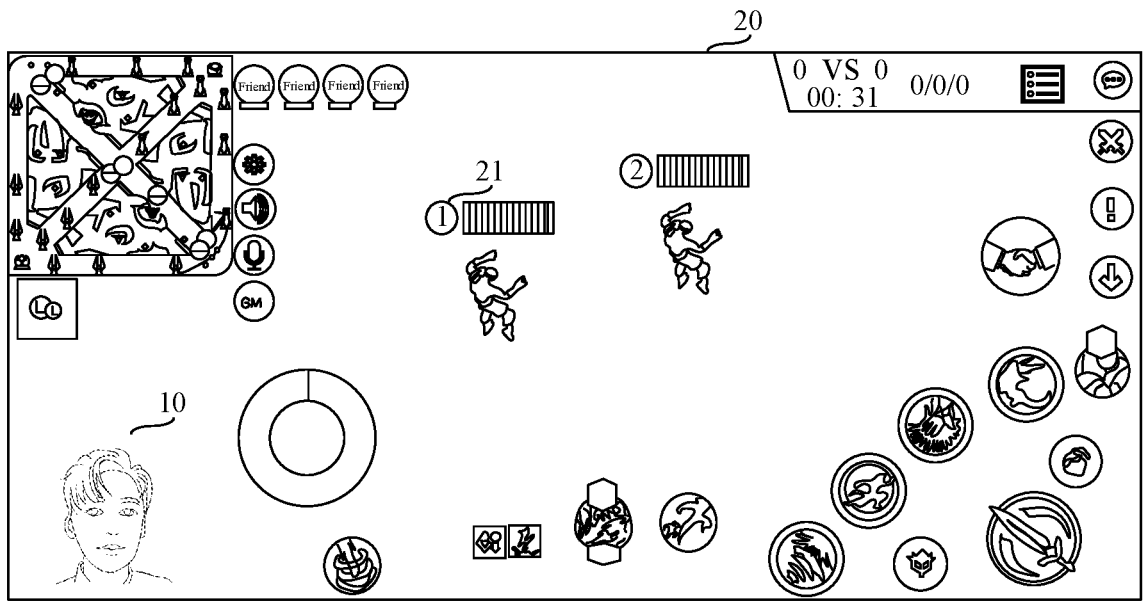
FIG. 4 is a schematic diagram of an interface of a live broadcast interactive role according to an exemplary embodiment of the present application.

For example, FIG. 4 shows a schematic diagram of an interface of a live broadcast interactive role according to an exemplary embodiment of the present application. A live broadcast interactive role 10 and a live broadcast picture 20 are displayed in the audience client. The live broadcast interactive role 10 is displayed above the live broadcast picture 20. The live broadcast picture 20 is a virtual activity picture acquired through the anchor account. In the live broadcast picture 20, the first virtual role 21 conducts virtual activities in the virtual world.

Optionally, there are at least three implementations to display the live broadcast interactive role.

Implementation 1: The live broadcast interactive role is set by the anchor client.

For example, the anchor user can set the live broadcast interactive role by logging in the anchor account on the anchor client. That is, the live broadcast picture is displayed, and the live broadcast interactive role located on the live broadcast picture and set by the anchor client is displayed. For example, the anchor client can set a form and/or an interactive action of the live broadcast interactive role. The form of the live broadcast interactive role includes but is not limited to at least one of: the gender of the live broadcast interactive role and a role model style of the live broadcast interactive role. The interactive action of the live broadcast interactive role includes but is not limited to at least one of: performing an action conforming to the first gesture, speaking the first voice, playing the first expression, and changing a position on the live broadcast picture.

Implementation 2: The live broadcast interactive role is associated with the first virtual role.

For example, the first virtual role and the live broadcast interactive role have a same or similar role appearance. That is, the live broadcast picture is displayed, and a live broadcast interactive role located on the live broadcast picture and associated with the first virtual role is displayed. Optionally, the interactive action of the live broadcast interactive role is the same as or similar to the virtual action of the first virtual role.

For example, a way in which the live broadcast interactive role is associated with the first virtual role includes at least one of: the first virtual role and the live broadcast interactive role having the same or similar appearance; and the interactive action of the live broadcast interactive role being the same as or similar to the virtual action of the first virtual role.

The first virtual role and the live broadcast interactive role have a similar role appearance, which indicates that the similarity between role appearances of the first virtual role and the live broadcast interactive role is greater than or equal to an appearance similarity threshold. For example, if the similarity between the role appearances of the first virtual role and the live broadcast interactive role is more than 90%, it indicates that the first virtual role and the live broadcast interactive role are similar in appearance. When the similarity between the role appearances of the first virtual role and the live broadcast interactive role is 100%, it indicates that the role appearances of the first virtual role and the live broadcast interactive role are the same.

The interactive action of the live broadcast interactive role is similar to an action of the first virtual role, which indicates that the similarity between the interactive action of the live broadcast interactive role and the action of the first virtual role is greater than an action similarity threshold. For example, if the similarity between the action of the first virtual role and the interactive action of the live broadcast interactive role is more than 90%, it indicates that the action of the first virtual role is similar to the interactive action of the live broadcast interactive role. When the similarity between the action of the first virtual role and the interactive action of the live broadcast interactive role is 100%, it indicates that the action of the first virtual role is the same as the interactive action of the live broadcast interactive role.

Implementation 3: The live broadcast interactive role is a virtual role set by the anchor client and associated with the first virtual role.

For example, the live broadcast picture is displayed, and a live broadcast interactive role located on the live broadcast picture, set by the anchor client and associated with the first virtual role is displayed. The first virtual role and the live broadcast interactive role have a same or similar role appearance.

The settings of the live broadcast interactive role can refer to Implementation 1, and an association mode between the live broadcast interactive role and the first virtual role can refer to Implementation 2, which will not be repeatedly described here again.

Step 522: Display the live broadcast interactive role performing the first interactive action in response to an activity of the first virtual role eliminating the second virtual role in the virtual world meeting the first trigger condition.

In this embodiment, the first trigger condition is that the first virtual role eliminates other virtual roles in the virtual world. For example, the first trigger condition includes but is not limited to at least one of: the first virtual role eliminating other virtual roles in the virtual world for the first time, a number of other virtual roles eliminated by the first virtual role in the virtual world reaching a first threshold, and a time interval for which the first virtual role eliminates other virtual roles twice in the virtual world is less than a second threshold. For example, a way for the first virtual role to eliminate the second virtual role includes but is not limited to at least one of: knocking down the second virtual role, causing the second virtual role to be with a health value of 0, and taking the lead in completing a virtual task over the second virtual role.

In this embodiment, the trigger condition is used to instruct the live broadcast interactive role to perform the first interactive action. The trigger condition may be that the first virtual role performs the virtual activity in the virtual world. For example, the first virtual role uses smoke bomb props, the first virtual role drives a jeep, or the first virtual role shoots at a first virtual building. It can also be an event caused by the first virtual role performing virtual activities in the virtual world. For example, the first virtual role confronts the second virtual role, resulting in the death of the second virtual role, the first virtual role driving the jeep across a finish line, and high-five interaction between the first virtual role and the second virtual role, so as to complete the first virtual task.

Figure 5:
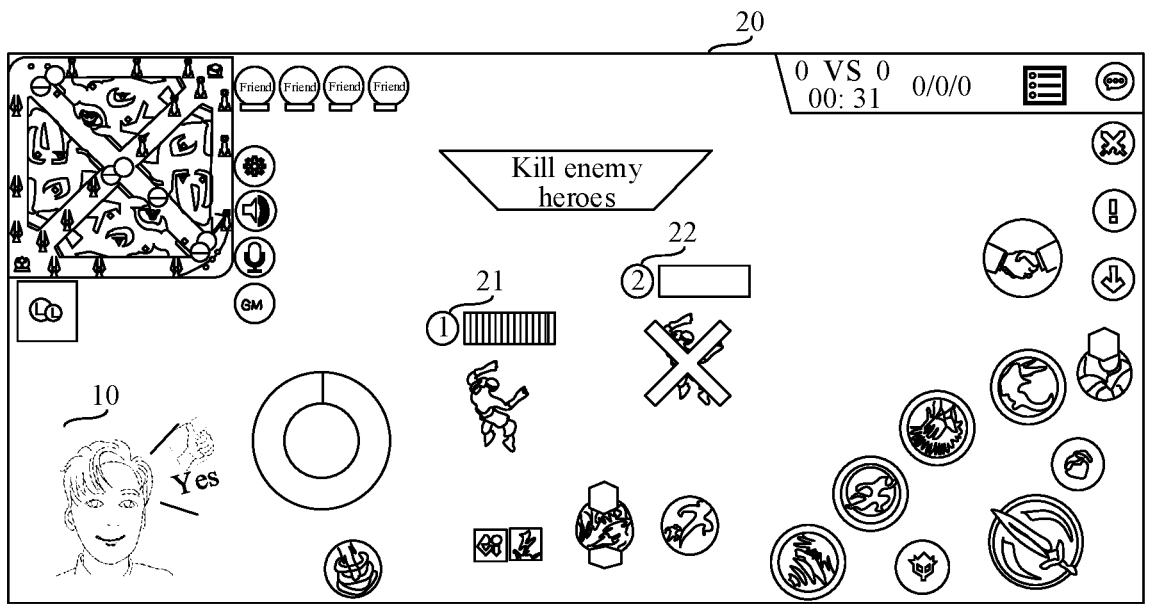
FIG. 5 is a schematic diagram of an interface of a live broadcast interactive role playing a first expression according to an exemplary embodiment of the present application.

FIG. 5 shows a schematic diagram of an interface of a live broadcast interactive role according to an exemplary embodiment of the present application. A live broadcast interactive role 10 and a live broadcast picture 20 are displayed in the audience client. The live broadcast interactive role 10 is displayed above the live broadcast picture 20. In the live broadcast picture 20, the first virtual role 21 conducts a virtual activity in the virtual world. When the first virtual role 21 eliminates the second virtual role 22 in the virtual world, the first trigger condition is met, and the audience client displays the live broadcast interactive role 10 to perform the first interactive action. The first interactive action is that the live broadcast interactive role 10 plays a smile expression, shows a gesture of praise, and plays a voice message with the content of "Yes".

Step 524: Display the live broadcast interactive role performing the first interactive action in response to an activity of the first virtual role being eliminated by the third virtual role in the virtual world meeting the second trigger condition.

In this embodiment, the second trigger condition is that the first virtual role is eliminated by other virtual roles in the virtual world. For example, the second trigger condition includes but is not limited to at least one of: the first virtual role being eliminated by other virtual roles in the virtual world for the first time, a number of times for which the first virtual role is eliminated by other virtual roles in the virtual world reaching a third threshold, and a time interval for which the first virtual role is eliminated by other virtual roles twice in the virtual world being less than the second threshold. For example, a way for the third virtual role to eliminate the first virtual role includes but is not limited to at least one of: knocking down the first virtual role, causing the first virtual role to be with a health value of 0, and taking the lead in completing a virtual task over the first virtual role.

Step 526: Display the live broadcast interactive role performing the first interactive action in response to an activity of the first virtual role completing the first task in the virtual world meeting a third trigger condition.

In this embodiment, the third trigger condition is that the first virtual role completes the first task in the virtual world. For example, the third trigger condition includes but is not limited to at least one of: the first virtual role completing the competitive game in the virtual world, the first virtual role reaching a certain level (or a target level or a preset level) in the virtual world, and the first virtual role reaching a certain rank (or a target rank or a preset rank) in the virtual world. For example, a way for the first virtual role to complete the first task includes but is not limited to at least one of: knocking down the second virtual role, causing the first virtual building to be with a durability value of 0, and knocking down all virtual roles.

Optionally, this embodiment further includes at least one of the following steps.

Display the live broadcast interactive role performing the first interactive action in response to an activity of the first virtual role using a first prop in the virtual world meeting a fourth trigger condition.

In this embodiment, the fourth trigger condition is that the first virtual role uses the first prop in the virtual world. For example, the fourth trigger condition includes but is not limited to at least one of: the first virtual role using the first prop in the virtual world for the first time, the first virtual role picking up the first prop in the virtual world for the first time, and the first virtual prop used by the first virtual role in the virtual world having an effect on the second virtual role. For example, a way for the first virtual role to use the first prop includes but is not limited to at least one of: picking up the first prop, triggering the effect of the first prop, and setting the first prop in a to-be-used state or a to-be-effective state.

Display the live broadcast interactive role performing the first interactive action in response to an activity of the first virtual role adjusting a body posture in the virtual world meeting a fifth trigger condition.

In this embodiment, the fifth trigger condition is that the first virtual role adjusts the body posture in the virtual world. For example, the fifth trigger condition includes but is not limited to at least one of: the first virtual role triggering a virtual expression in the virtual world to adjust the body posture, and the first virtual role performing a first operation to adjust the body posture in the virtual world.

To sum up, in the method according to this embodiment, the live broadcast interactive role is linked to the first virtual role in the virtual world by adding the live broadcast interactive role, and the live broadcast interactive role performing the first interactive action is displayed according to events such as the first virtual role eliminating other virtual roles in the virtual world and completing the first task, thus enriching interaction modes between the anchor user and the audience user in the process of webcasting, narrowing a distance between the audience user and the first virtual role in the virtual world, and the anchor user shares a task of interacting with the audience user with the live broadcast interactive role, thus improving interactive efficiency in the process of webcasting.

In the following, the three-dimensional interactive action is described. In the above embodiment, the first interactive action is a three-dimensional interactive action, and displaying the live broadcast interactive role performing the first interactive action can be realized as following sub-steps.

A client controls the live broadcast interactive role to perform the three-dimensional interactive action corresponding to the trigger condition, and displays the live broadcast interactive role performing a three-dimensional interactive action corresponding to the trigger condition.

It is to be understood that, the live broadcast interactive role is a virtual role based on a three-dimensional model. The three-dimensional model can be a virtual role model with a three-dimensional structure, or it can be a role model that combines multiple two-dimensional models and shows three-dimensional changes by changing shape attributes of the two-dimensional models.

For example, the three-dimensional interactive action includes, but is not limited to, at least one of:
performing an action conforming to the first posture; such as a waving action, a rolling acting, a hugging, and a jumping action;
speaking the first voice; such as speaking a voice message with the content of "mission successful";
playing the first expression; such as a smiling expression, a depressed expression and a crying expression; and
changing the position on the live broadcast picture; such as moving from an upper right corner of the live broadcast picture to an upper left corner, and increasing an occupied area of one eighth of an area of the live broadcast picture to an occupied area of a quarter of the area of the live broadcast picture.

The three-dimensional interactive action can control all of role models of the live broadcast interactive role to act, and can also control a part of the role models of the live broadcast interactive role to act. For example, playing the first expression only controls a face of the live broadcast interactive role to act, and executing the action conforming to the first posture controls all of the model parts of the live broadcast interactive role to act. It can be understood that in this embodiment of the present application, detailed description of the second interactive action can refer to the above.

Optionally, the three-dimensional interactive action is associated with the virtual activity of the first virtual role in the virtual world. The live broadcast interactive role is the mapping of the first virtual role on an audience's livestreaming terminal.

For example, a correspondence and/or a continuing relationship is presented between the three-dimensional interactive action and the virtual activity.

For example, the three-dimensional interactive action of the live broadcast interactive role is the same as the virtual activity of the first virtual role in the virtual world. Specifically: if the first virtual role falls down, the live broadcast interactive role also falls down. If the first virtual role drives the first virtual vehicle, the live broadcast interactive role also drives the first virtual vehicle. The three-dimensional interactive action described above have the same nature as the virtual activity, but they are different in animation or action appearance.

The three-dimensional interactive action of the live broadcast interactive role is emotionally connected with the virtual activity of the first virtual role in the virtual world. Specifically: if the first virtual role kills the second virtual role in the virtual world, the live broadcast interactive role plays happy expression animation. If the first virtual role fails to complete the first task in the virtual world, the live broadcast interactive role plays depressed expression animation.

The three-dimensional interactive action of the live broadcast interactive role is connected in action with the virtual activity of the first virtual role in the virtual world. Specifically: if the first virtual role executes the first virtual expression in the virtual world and the first virtual expression includes a first dance action, the live broadcast interactive role executes a dance interactive action after the first virtual role executes the first virtual expression in the virtual world, and the dance interactive action is a follow-up action of the first dance action.

Figure 6:
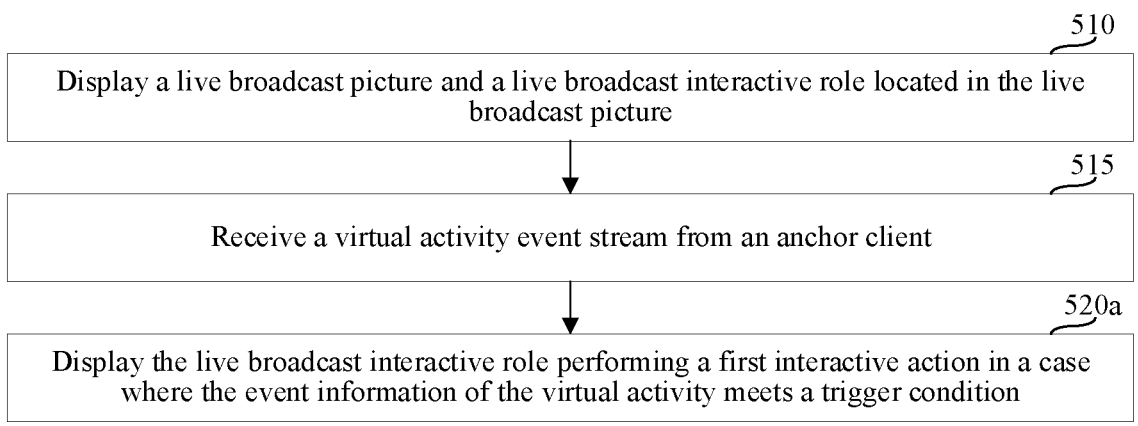
FIG. 6 is a flowchart of a live broadcast interactive method according to an exemplary embodiment of the present application.

In the following, reference is made to FIG. 6, which shows a flowchart of a live broadcast interactive method according to an exemplary embodiment of the present application. A virtual activity event stream is described. The method may be executed by a computing device and can be applied to the audience client.

Step 515: Receive a virtual activity event stream from an anchor client.

The virtual activity event stream carries event information of the virtual activity. The event information is used to indicate a virtual activity that the first virtual role conducts in the virtual world. For example, the event information indicates the virtual activity using at least one of a feature vector, a feature matrix, a feature value or bit information. The event information can indicate all of the virtual activities of the first virtual role in the virtual world, or only a part of the virtual activities of the first virtual role in the virtual world. That is, the event information is transmitted only when the event is triggered. For example, if event information indicates a driving activity and a confrontation activity, event information is not transmitted during other virtual activities.

Optionally, the event information is used to indicate whether the virtual activity of the first virtual role in the virtual world meets the trigger condition. For example, when the virtual activity of the first virtual role in the virtual world meets the first trigger condition, the event information is a first feature value. When the virtual activity of the first virtual role in the virtual world meets the second trigger condition, the event information is a feature value.

Step 520*a*: Display the live broadcast interactive role performing the first interactive action when the event information of the virtual activity meets the trigger condition.

In this embodiment, it is determined whether the trigger condition is met or not according to the event information of the virtual activity carried in the virtual activity event stream. When the event information meets the trigger condition, the live broadcast interactive role performing the first interactive action is displayed.

To sum up, in the method according to this embodiment, the event information in the virtual world can be acquired by the audience client by receiving the virtual activity event stream, which lays a foundation for displaying the live broadcast interactive role performing the first interactive action. The connection between the live broadcast interactive role and the first virtual role in the virtual world is realized, which lays a foundation for the anchor user to share the task of interacting with the audience user with the live broadcast interactive role.

Figure 7:
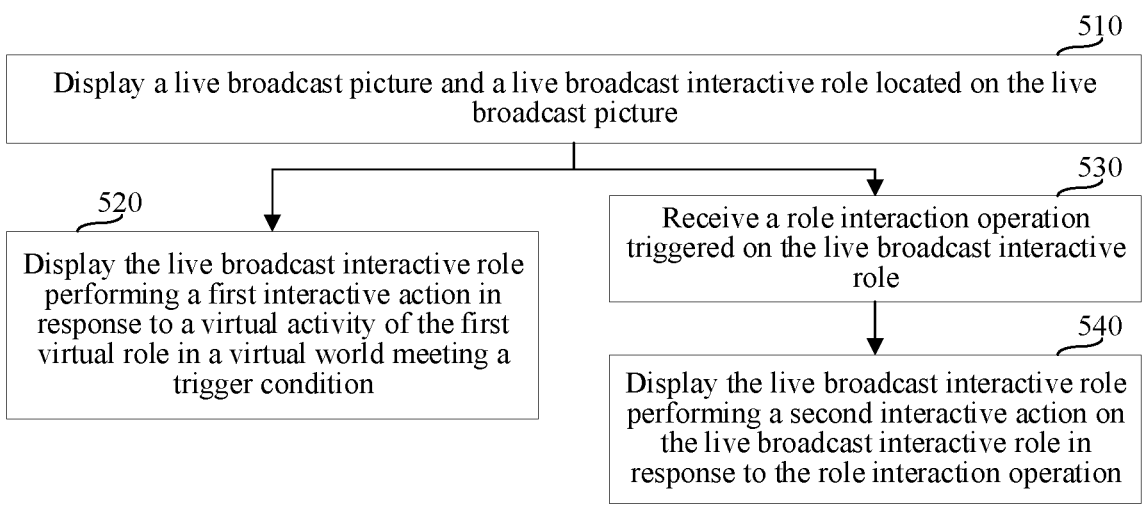
FIG. 7 is a flowchart of a live broadcast interactive method according to an exemplary embodiment of the present application.

In an alternative embodiment based on the above embodiments, as shown in FIG. 7, the method described above may further include two steps, Step 530 and Step 540.

Step 530: Receive a role interaction operation triggered on the live broadcast interactive role.

The role interaction operation is an operation of the live broadcast interactive role, which is used to trigger the interactive action of the live broadcast interactive role. For example, modes of the role interaction operation include but are not limited to at least one of: a clicking operation, a dragging operation, a two-finger pinching operation and a rotation operation.

Step 540: Display the live broadcast interactive role performing the second interactive action in response to the role interaction operation.

In this embodiment, detailed introduction of the three-dimensional interactive action above can be referred for a detailed introduction of the second interactive action.

Optionally, Step 540 includes any one of the following three implementations.

Implementation 1 In response to the role interaction operation and based on the role part triggered by the role interaction operation, the live broadcast interactive role performing the second interactive action corresponding to the role part is displayed.

For example, in response to the role interaction operation, second action data corresponding to the role part triggered by the role interaction operation is acquired, and the second action data is data instructing the role part of the three-dimensional model of the live broadcast interactive role and/or other parts associated with the role part to perform actions. The role part of the three-dimensional model and/or other parts associated with the role part is controlled to perform the second interactive action based on the second action data.

For example, the role part of the live broadcast interactive role corresponds to the second interactive action, and the role part of the live broadcast interactive role includes but is not limited to at least one of: a head, a face, a mouth, a neck, a body, a hand, an arm, a stomach, a leg and a foot. There may be overlapping areas between the role parts described above. For example, if the hand of the live broadcast interactive role is clicked, the live broadcast interactive role performs the waving action. If a body part of the live broadcast interactive role is dragged, the live broadcast interactive role performs a rolling action. It is to be understood that, a correspondence between the role part and the second interactive action can be preset or can be user-defined by the anchor user and/or the audience user.

Figure 8:
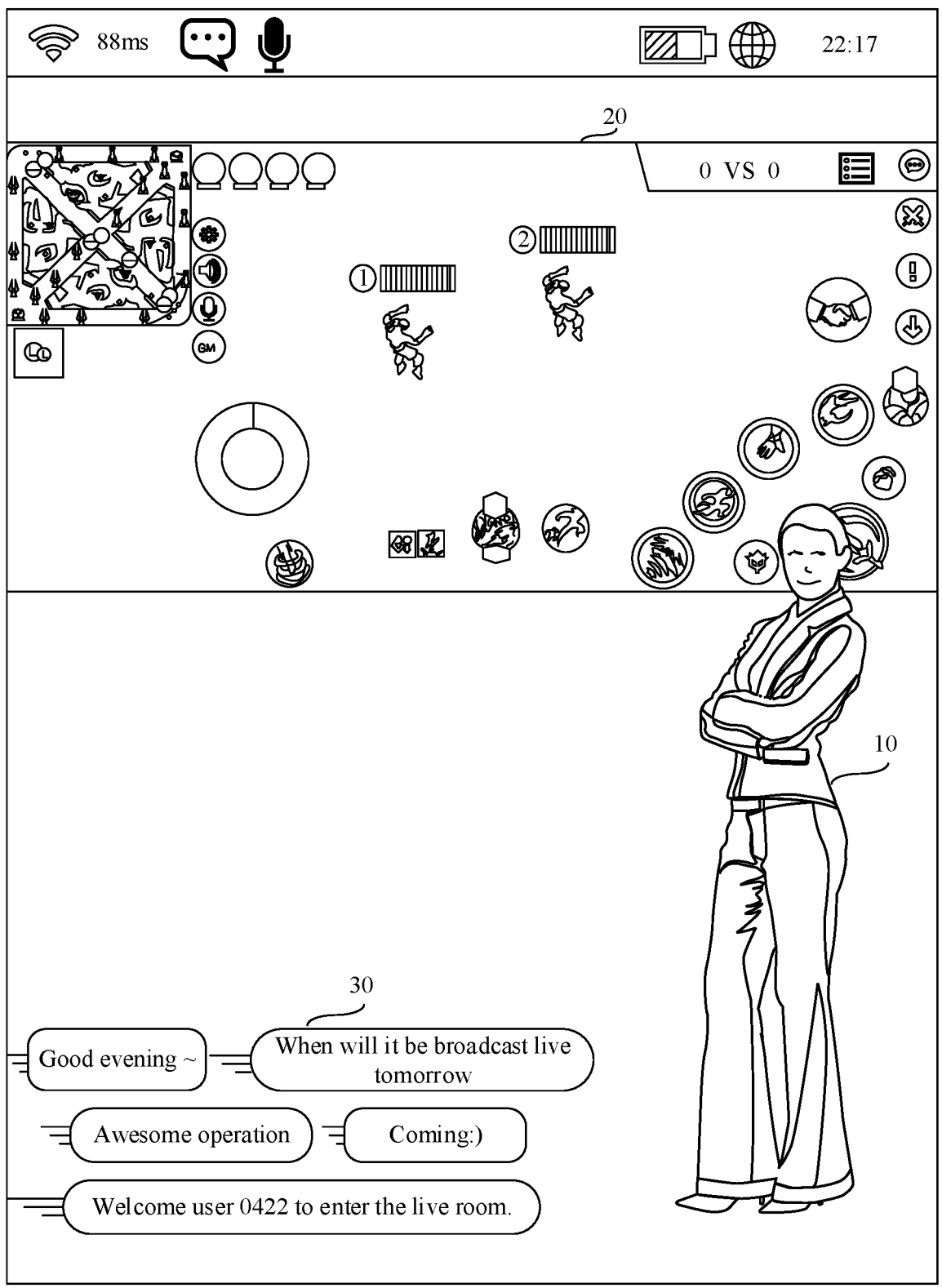
FIG. 8 is a schematic diagram of an interface of a live broadcast interactive role according to an exemplary embodiment of the present application.

FIG. 8 shows a schematic diagram of an interface of a live broadcast interactive role according to an exemplary embodiment of the present application. A live broadcast interactive role 10, a live broadcast picture 20 and a comment interactive area 30 are displayed in the audience client. The live broadcast interactive role 10 is displayed above the live broadcast picture 20. The audience user can transmit text messages to interact with the anchor user, and the text messages are displayed on the comment interaction area 30.

Figure 9:
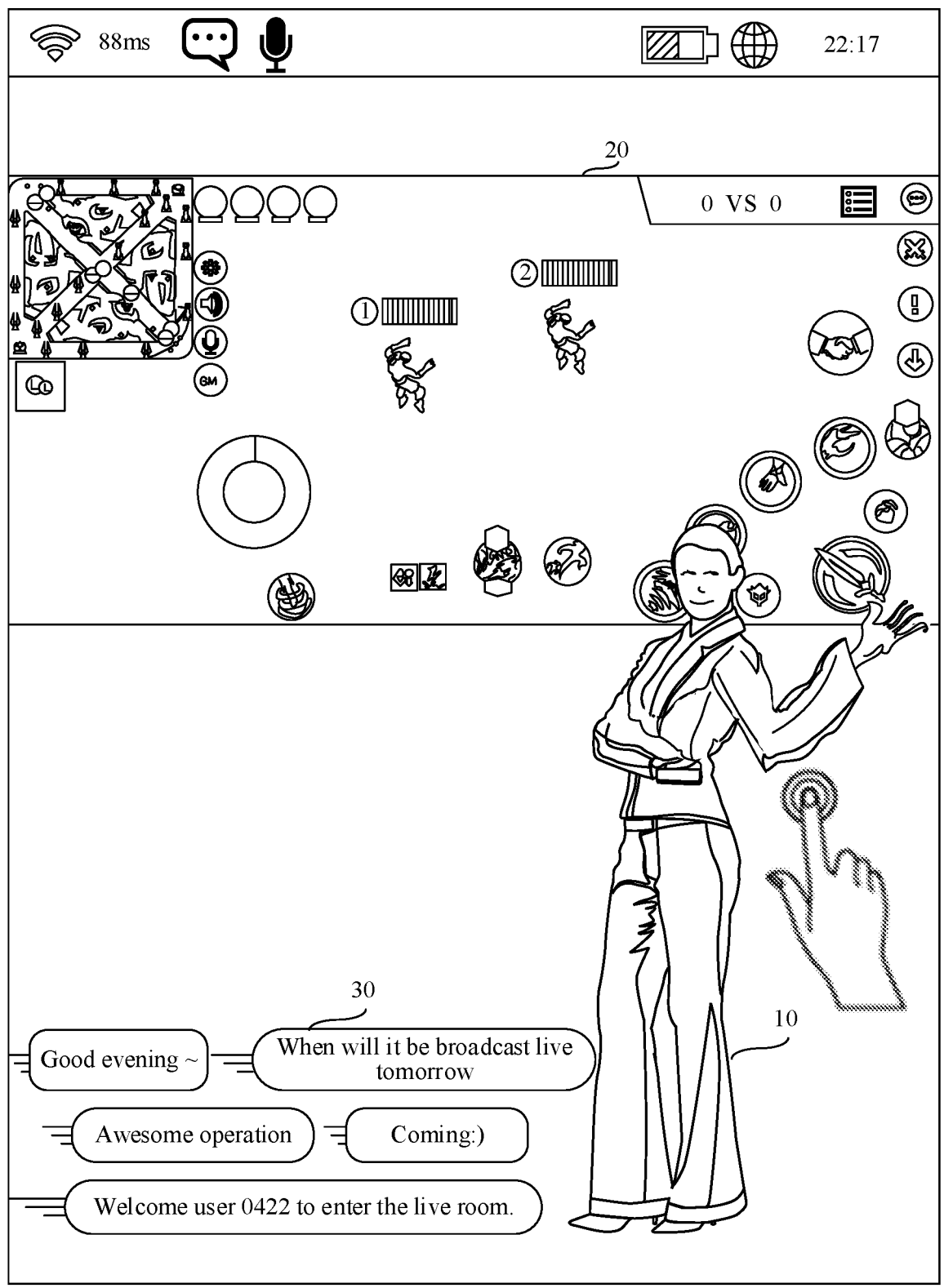
FIG. 9 is a schematic diagram of an interface of a live broadcast interactive role performing an action conforming to a first gesture according to an exemplary embodiment of the present application.

FIG. 9 shows a schematic diagram of an interface of a live broadcast interactive role according to an exemplary embodiment of the present application. A live broadcast interactive role 10, a live broadcast picture 20 and a comment interactive area 30 are displayed in the audience client. The live broadcast interactive role 10 performs the waving action in response to the audience user performing the clicking operation on the hand of the live broadcast interactive role 10.

Implementation 2 The second interaction action corresponding to a dragging operation is performed following the dragging operation in response to the role interaction operation being the dragging operation.

For example, the third action data corresponding to the dragging operation is acquired in response to the role interaction operation being the dragging operation, and the third action data is data instructing a part or all of the role parts of the three-dimensional model of the live broadcast interactive role to perform actions. Part or all of the role parts of the three-dimensional model are controlled to perform the second interactive action based on the third action data.

For example, crying expression data and crying sound data of a crying action corresponding to the dragging operation are obtained in response to the role interaction operation being the dragging operation. The face of the three-dimensional model of the live broadcast interactive role is controlled to execute the crying expression based on the crying expression data, and a crying sound is played based on the crying sound data.

For example, when the role interaction operation is the dragging operation, the live broadcast interactive role changes its position on the live broadcast picture following the dragging operation, and performs the first interaction action corresponding to the dragging operation. For example, the crying expression is played when the role interaction operation is the dragging operation.

Figure 10:
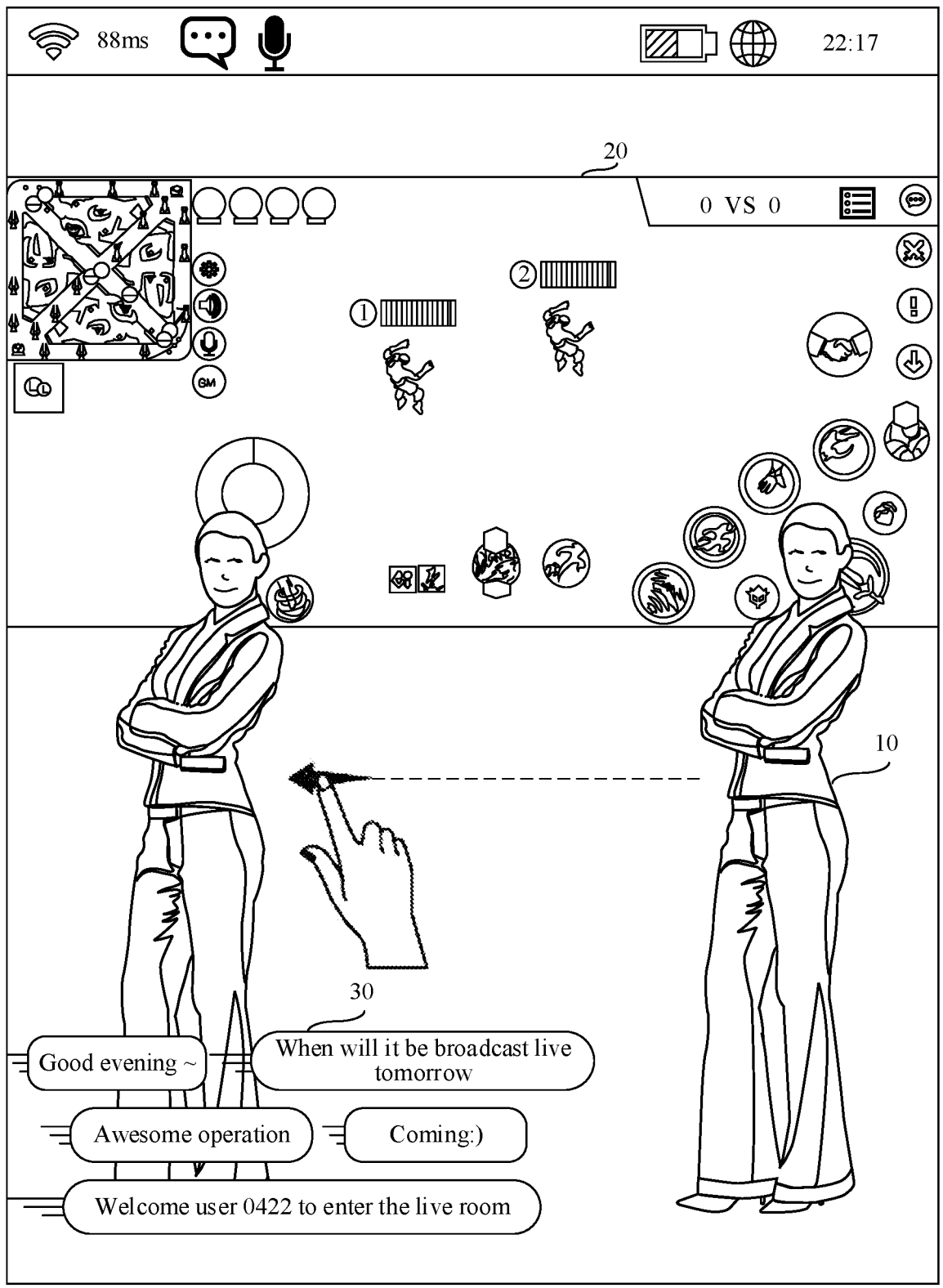
FIG. 10 is a schematic diagram of an interface for changing a position of a live broadcast interactive role on a live broadcast picture according to an exemplary embodiment of the present application.

FIG. 10 shows a schematic diagram of an interface of a live broadcast interactive role according to an exemplary embodiment of the present application. A live broadcast interactive role 10, a live broadcast picture 20 and a comment interactive area 30 are displayed in the audience client. The live broadcast interactive role 10 moves from the first position to the second position following the dragging operation in response to the dragging operation of the audience user on the live broadcast interactive role 10.

Implementation 3 The second interactive action of replying to text content and/or voice content input in the audience client is performed based on the text content and/or voice content in response to the role interaction operation being a dialog operation.

For example, the audience client can record historical livestreaming content, and execute the second interactive action of replying to the text content and/or voice content based on the historical livestreaming content when the input text content and/or voice content are repeated questions that the anchor has replied.

As another example, the audience client is provided with intelligent customer service, and reply content to the text content and/or voice content is determined with the intelligent customer service, and the second interactive action of replying to the text content and/or voice content is executed based on the reply content.

For example, forth action data corresponding to the dialog operation is acquired in response to the role interaction operation being the dialog operation, and the forth action data is data instructing a part or all of the role parts of the three-dimensional model of the live broadcast interactive role to perform actions. Part or all of the role parts of the three-dimensional model are controlled to perform the second interactive action based on the forth action data.

For example, a reply voice corresponding to the input voice content is acquired in response to the role interaction operation being the dialog operation. Opening and closing data of a mouth of the three-dimensional model is determined based on the reply voice. Based on the opening and closing data corresponding to the reply voice, the mouth of the three-dimensional model is controlled to open and close and the reply voice is played.

It is to be understood that, in this embodiment, there is no restriction on an execution timing relationship between Step 520 and a first branch, that is, Step 520 can be executed before, after or simultaneously with any step in the first branch. The first branch includes Step 530 and Step 540.

To sum up, in the method provided in this embodiment, by adding the live broadcast interactive role, the anchor user can interact with the audience user through a live broadcast interactive role in a process of webcasting. The audience user can directly interact with the live broadcast interactive role through an interactive operation, which enriches interaction modes between the audience user and the anchor user, provides a fast and convenient interactive mode for the audience user, and avoids a tedious text input process for the text comment, or avoids a case that the anchor needs to repeatedly answer some questions or fails to respond to audience questions in time.

Figure 11:
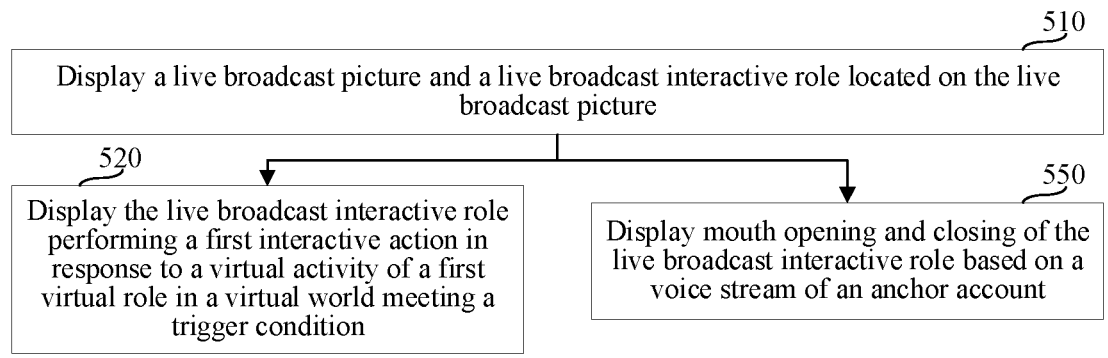
FIG. 11 is a flowchart of a live broadcast interactive method according to an exemplary embodiment of the present application.

In an alternative embodiment based on the above embodiments, as shown in FIG. 11, the method may further include Step 550.

Step 550: Display mouth opening and closing of the live broadcast interactive role based on a voice stream of the anchor account.

The voice stream of the anchor account carries voice information in the process of livestreaming. For example, the voice stream of the anchor account is the voice information of an anchor microphone channel. Optionally, the mouth opening and closing of the live broadcast interactive role has a preset shape. For example, there are five preset shapes for the mouth opening and closing of the live broadcast interactive role. Based on the voice stream of the anchor account, the mouth opening and closing of the live broadcast interactive role is displayed as a first preset shape.

Optionally, Step 550 can be implemented as the following three sub-steps:

Acquire pitch information of the voice stream of the anchor account.

For example, the pitch information is a pitch extreme value carried in the voice stream of the anchor account. The pitch is determined according to the voice volume of the anchor account, and the pitch extreme value is used to describe an extreme value of the pitch information. The pitch information can be acquired directly from the voice stream of the anchor account, or can be obtained by processing the voice stream of the anchor account. For example, a method for processing the voice stream of the anchor account includes, but is not limited to: time domain transformation, frequency domain transformation, changing a mapping relationship.

Determine a mouth shape of the live broadcast interactive role according to the pitch information.

For example, a method for determining the mouth shape of the live broadcast interactive role includes, but is not limited to, at least one of: inputting the pitch information into an artificial neural network to predict the mouth shape of live broadcast interactive role; and establishing a correspondence between the pitch information and the mouth shape of the live broadcast interactive role, and determining the mouth shape of live broadcast interactive role according to the correspondence.

Further alternatively, the determining the mouth shape of the live broadcast interactive role according to the pitch information can be implemented as follows.

A sum of pitch information in the first period is calculated periodically. A first pitch threshold interval corresponding to the sum of the pitch information is determined among n pitch threshold intervals. A mouth shape corresponding to the first pitch threshold interval is queried in a mouth shape correspondence as the mouth shape of the live broadcast interactive role. The mouth shape correspondence includes correspondences between n pitch threshold intervals and m mouth shapes, values of n and m are positive integers, and a value of m is less than or equal to that of n. Each pitch threshold interval has a unique mouth shape corresponding to it. For example, the first period refers to a current period.

The period can be set according to experience or according to the voice stream of the anchor account. For example, when the voice stream of the anchor account includes two channels, a calculated period of a sum of pitch information is set to 20 milliseconds.

For example, a sum of pitch information in the current 20 ms period is calculated as a first numerical value, and the pitch threshold interval to which the first numerical value belongs is determined as the first pitch threshold interval. The first pitch threshold interval corresponds to a first mouth shape, the first mouth shape is a preset shape with the largest mouth opening among preset shapes for mouth opening and closing of the live broadcast interactive role.

Display the mouth opening and closing of the live broadcast interactive role based on the mouth shape of the live broadcast interactive role.

For example, the mouth shape of the live broadcast interactive role is used to indicate a preset shape for the mouth opening and closing of the live broadcast interactive role, and the corresponding mouth opening and closing of the live broadcast interactive role is displayed according to the preset shape for the mouth opening and closing indicated by the mouth shape of the live broadcast interactive role.

Figure 12:
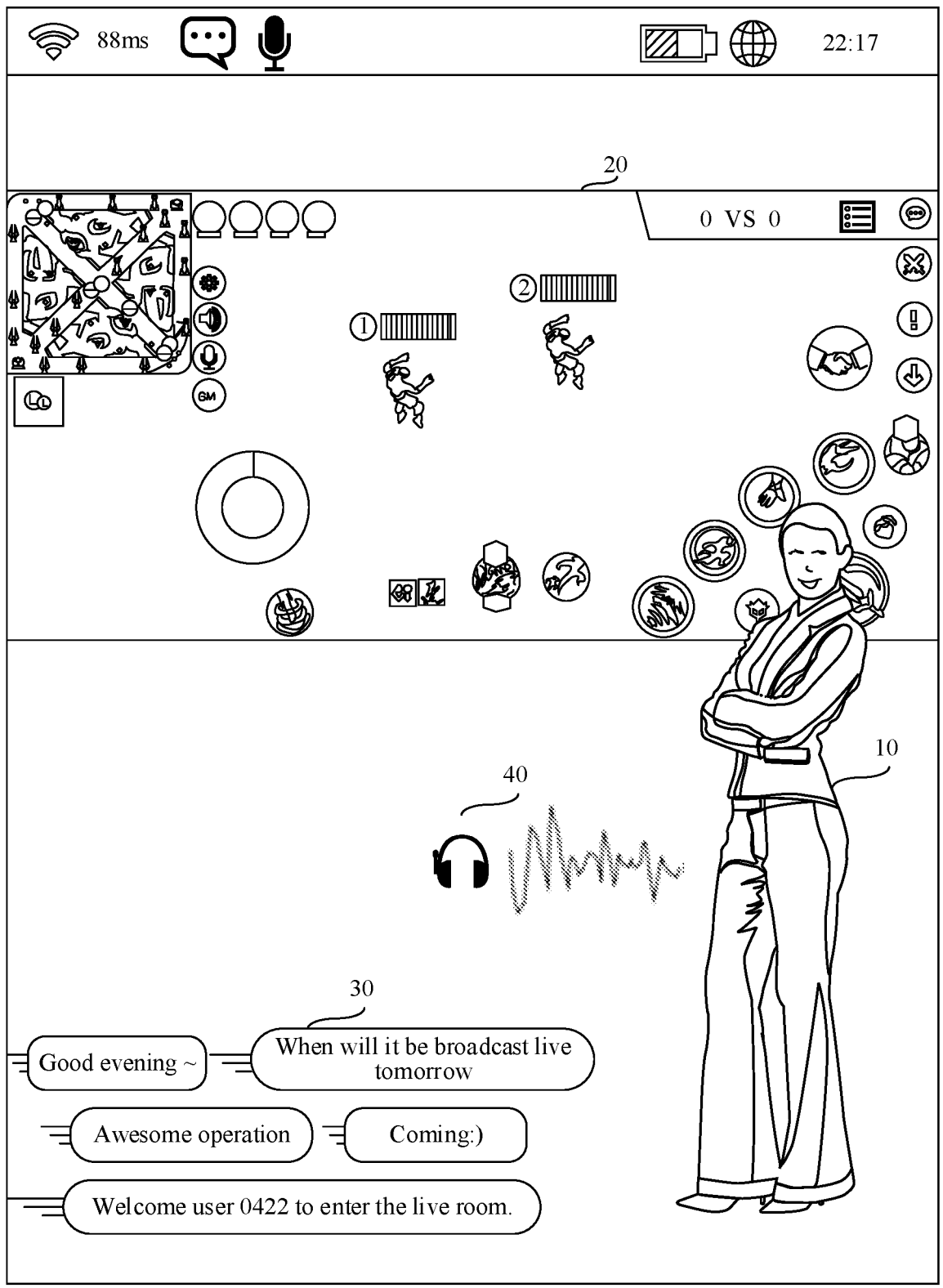
FIG. 12 is a schematic diagram of an interface of displaying the mouth opening and closing of a live broadcast interactive role according to an exemplary embodiment of the present application.

FIG. 12 shows a schematic diagram of an interface of a live broadcast interactive role according to an exemplary embodiment of the present application. A live broadcast interactive role 10, a live broadcast picture 20 and a comment interactive area 30 are displayed in the audience client. Based on a voice stream 40 of the anchor account, the mouth opening and closing of the live broadcast interactive role 10 is displayed as the first preset shape. It is to be understood that, displaying of the voice stream 40 of the anchor account can be hidden in the audience client.

It is to be understood that, in this embodiment, an order of performing Step 520 and Step 550 is not limited, step 520 may be performed before, after or simultaneously with Step 550.

To sum up, in the method provided in this embodiment, by adding the live broadcast interactive role, the anchor user can interact with the audience user through a live broadcast interactive role in a process of webcasting. By displaying the mouth opening and closing of the live broadcast interactive role according to the voice stream of the anchor account, a restoration degree of the live broadcast interactive role to the anchor user is improved, and the distance between the audience user and the anchor user is shortened. Meanwhile, it provides a simple way for the anchor user to show the live broadcast interactive role without buying motion capture devices such as cameras, which reduces the cost of webcasting.

Figure 13:
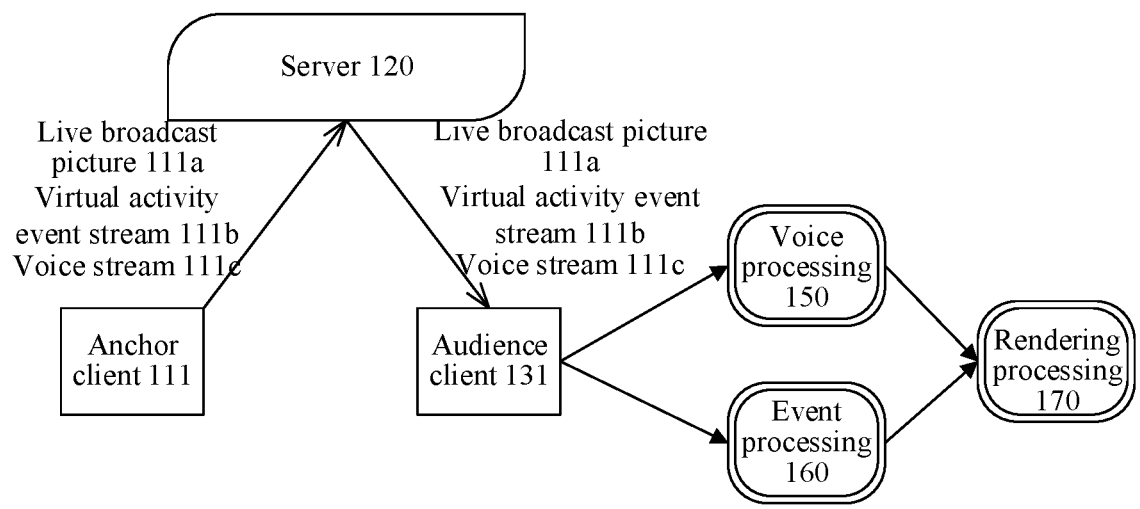
FIG. 13 is a flowchart of anchor interacting according to an exemplary embodiment of the present application.

FIG. 13 shows a flowchart of anchor interacting according to an exemplary embodiment of the present application.

Figure 14:
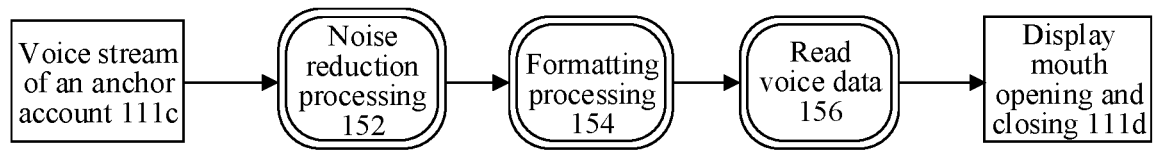
FIG. 14 is a flowchart of voice processing according to an exemplary embodiment of the present application.

The anchor account is logged in the anchor client 111 for webcasting. The anchor client 111 uploads a live broadcast picture 111*a* acquired in the process of webcasting, a virtual activity event stream 111*b* and a voice stream 111*c* to the server 120, that is, a background of a livestreaming platform. The server 120 transmits the live broadcast picture 111*a*, the virtual activity event stream 111*b* and the voice stream 111*c* to the audience client 131, and the audience user logs in the audience account on the audience client 131 to watch the webcasting. After the audience client 131 receives the live broadcast picture 111*a*, the virtual activity event stream 111*b* and the voice stream 111*c*, it is necessary to perform voice processing on the voice stream 111*c* of the anchor account. FIG. 14 shows a detailed flow of voice processing 150. Event processing 160 is performed on the event information 111*b* in a game time stream to determine information of the live broadcast interactive role, and rendering processing 170 is performed on the live broadcast interactive role.

FIG. 14 shows a flowchart of voice processing 150 according to an exemplary embodiment of the present application.

For example, in this embodiment, a data format of the voice stream 111*c* of the anchor account includes but is not limited to at least one of: Pulse Code Modulation (PCM), WaveForm (WAV), Audio Interchange File Format (AIFF) and Windows Media Audio (WMA).

The voice stream 111*c* of the anchor account is subjected to noise reduction processing 152 to obtain the noise-reduced voice stream of the anchor account, and a method for realizing noise reduction includes but is not limited to at least one of: filtering by a filter, Convolutional Neural Networks (CNN), and Recurrent Neural Network (RNN). For example, a Learning Noise Suppression (RNNoise) code base is used to perform the noise reduction processing on the voice stream of the anchor account to obtain the noise-reduced voice stream of the anchor account.

Formatting 154 is performed on the noise-reduced voice stream of the anchor account, to convert the voice stream into an array corresponding to the voice stream. For example, the array is a Float array, and the value range of the float array is not limited. For example, the float array is set to be with: floating-point numbers greater than or equal to minus 1 and less than or equal to 1. For example, a Unity game engine of the client formats the voice stream of the anchor account.

Voice data 156 is read from the array corresponding to the voice stream, the pitch extreme value in the array is acquired, a sum of the pitch information in the first period is periodically calculated, and a corresponding first pitch threshold interval is determined, a mouth shape corresponding to the first pitch threshold interval is queried in the mouth shape correspondence as the mouth shape of the live broadcast interactive role, and the mouth shape opening and closing of the live broadcast interactive role is displayed as the mouth shape corresponding to the first pitch threshold interval, that is, the mouth opening and closing 111*d* is displayed.

Optionally, first pitch threshold intervals respectively determined by the sum of pitch information in the first period and the sum of pitch information in a previous period are compared. In a case where the first pitch threshold intervals are different, rendering updating is performed, and the mouth opening and closing of the live broadcast interactive role is displayed as the mouth shape corresponding to the first pitch threshold interval corresponding to the sum of pitch information in the first period. That is, animation corresponding to the mouth opening and closing is played. For example, Blendshape animation or bone animation of the mouth opening and closing is played. In a case where the first pitch threshold intervals are the same, rendering updating is not performed, and the mouth opening and closing of the live broadcast interactive role is displayed as a mouth shape corresponding to the first pitch threshold interval corresponding to the sum of pitch information in the previous period.

In the following, WeAvatar rendering is taken as an example to describe the rendering processing 170.

A Weavar project is a Unity game engine project, in which compiled products of the World Wide Web in the Unity game engine project can be run dynamically in the application program directly based on the ability of WebAssembly, which can completely restore visual effects in the Unity game engine in a native interface of the application program, and the Weavar project has same effects in different operating systems. For example, effects in an Android operating system and an Apple mobile operating system (iOS) are the same. There is no need for additional cross-platform code development. At least one of the following is included in the WeAvatar project:

Art resource root directory (Art). For example, textures to which art resources are referenced include but are not limited to: Color map (Diffuse), Ambient Occlusion (AO), Roughness map (roughness) and Normal map (normal). Self-built materials (Materials) required for rendering, self-built shader languages (Shaders) used for rendering, and art three-dimensional model resources (Meshes).

Game plug-in code (Plugins). For example, a WebAssembly Software Development Kit (WASM-SDK) is responsible for communication with clients, a speech recognition and animation control module, and a physical animation module.

Game logic code (Scripts); For example, a Core code management module (Core) and an animation logic module (Animation).

Run-time game Scenes (Scenes).

Figure 15:
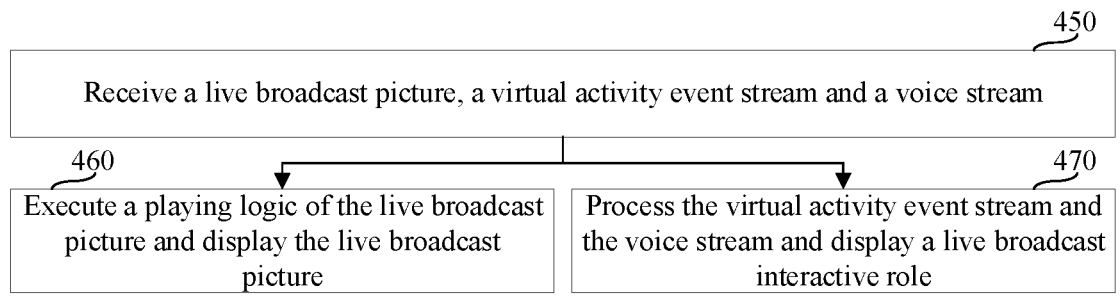
FIG. 15 is a flowchart of a live broadcast interactive method according to an exemplary embodiment of the present application.

FIG. 15 shows a flowchart of anchor interacting according to an exemplary embodiment of the present application. Referring to FIG. 15, a process of processing a received virtual activity event stream and voice stream by the audience client using the Unity game engine is described.

Step 450: Receive a live broadcast picture, a virtual activity event stream and a voice stream.

The audience client receives the live broadcast picture, the virtual activity event stream and the voice streams transmitted by the server or the anchor client. It can be understood by those skilled in the art that when the server transmits the above information to the audience client, the server can save the above information and transmit the above information to the audience client according to indication information of the audience client.

After receiving the live broadcast picture, the virtual activity event stream and the voice streams, the audience client needs to process the above information. For example, a process of processing the above information can be divided into two independent steps: Step 460 and Step 470, and an order of performing the above two steps is not limited in this application, that is, Step 460 can be executed before, after or simultaneously with Step 470.

Step 460: Execute a playing logic of the live broadcast picture and display the live broadcast picture.

in this embodiment, the live broadcast picture received by the audience client can be a picture rendered by the anchor client or the server, and the audience client displays the above picture. The live broadcast picture received by the audience client can also be a picture that has not been rendered by the anchor client or the server, and the audience client needs to render the above picture before displaying the live broadcast picture.

Step 470: Process the virtual activity event stream and the voice stream, and display the live broadcast interactive role.

For example, an example in which the audience client uses the Unity game engine to process the virtual activity event stream and the voice stream is taken for illustration.

The virtual activity event stream is input into the Unity game engine, and the Unity game engine triggers animation of the live broadcast interactive role corresponding to the live broadcast interactive role according to the interactive action of the live broadcast interactive role corresponding to the virtual activity event stream.

The voice stream is input into the Unity game engine, and the Unity game engine determines the mouth shape of the live broadcast interactive role according to voice information in the voice stream, and finally determines and displays the mouth shape opening and closing of the live broadcast interactive role.

Optionally, the audience client preprocesses the voice stream, and then uses the Unity game engine to process the voice stream. A preprocessing methods of the voice stream include but is not limited to at least one of: Noise reduction processing, adding reverberation, and adding masking effect.

For example, the Unity game engine renders the live broadcast interactive role, and the audience client displays the rendered live broadcast interactive role. Optionally, in Step 460, when the audience client renders the live broadcast picture, the rendering of the live broadcast picture is completed by the Unity game engine.

To sum up, in the method according to this embodiment, a process of adding the live broadcast interactive role and displaying the live broadcast picture and the live broadcast interactive role on the audience client is described in detail, and processes of the voice processing, the event processing and the rendering processing are described, which enriches the interaction modes between the anchor user and the audience user in the process of webcasting.

Figure 16:
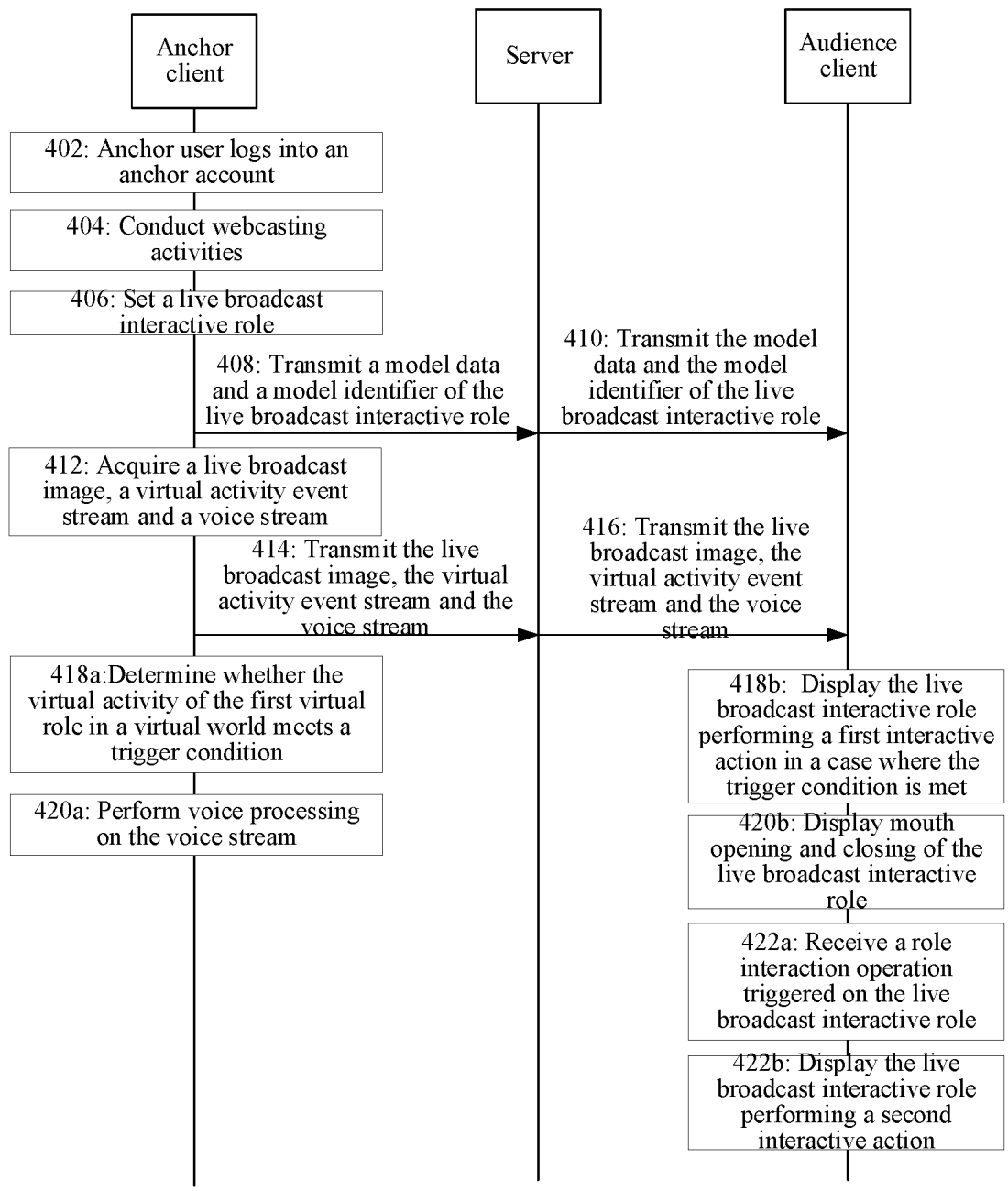
FIG. 16 is a flowchart of a live broadcast interactive method according to an exemplary embodiment of the present application.

FIG. 16 shows a flowchart of an anchor interactive method according to an exemplary embodiment of the present application. This method includes:

Step 402: Log in the anchor account at the anchor client by the anchor user.

Optionally, the anchor account of the anchor user at the anchor client can be bound with accounts of other clients; For example, the anchor account is bound to an account of a client that provides the first virtual role for virtual activities.

Step 404: The anchor user conducts webcasting activities at the anchor client.

For example, the anchor user conducts webcasting activities in a livestreaming room corresponding to the anchor account, and for example, the webcasting activities are game livestreaming.

Step 406: Set the live broadcast interactive role by the anchor client.

For example, the anchor client can set a gender, appearance, an interactive action and other information of the live broadcast interactive role to obtain model data and model identifier of the live broadcast interactive role that meets settings. The model data of the live broadcast interactive role is configured to describe the appearance of the live broadcast interactive role, and the model identifier of the live broadcast interactive role is configured to indicate a form of the live broadcast interactive role that needs to be displayed.

It is to be understood that setting the live broadcast interactive role by the anchor client can be performed without conducting the webcasting activities. That is, after logging in the anchor account, a live broadcast user does not conduct the webcasting activities, but only sets the live broadcast interactive role.

Step 408: Send the model data and the model identifier of the live broadcast interactive role to the server by the anchor client.

Step 410: Sends the model data and the model identifier of the live broadcast interactive role to the audience client by the server.

It is to be understood that, the server can save the model data and the model identifier of the live broadcast interactive role, and transmit the model data and the model identifier of the live broadcast interactive role to the audience client according to the indication information of the audience client. The server updates related information of an old live broadcast interactive role after receiving the model data and the model identifier of the live broadcast interactive role transmitted by the anchor client.

Step 412: Acquire the live broadcast picture, the virtual activity event stream and the voice stream by the anchor client.

The above three kinds of information can be acquired simultaneously or separately. The voice stream is generally voice data of a microphone channel of the anchor user, but it is not excluded that there is other channel data. In one implementation, the voice stream is a part of the live broadcast picture, that is, the voice stream is completely the same as the sound information of the live broadcast picture, and only the live broadcast picture can be transmitted to reduce the amount of data transmitted by the anchor client.

Step 414: Send the live broadcast picture, the virtual activity event stream and the voice stream to the server by the anchor client.

Step 416: Send the live broadcast picture, the virtual activity event stream and the voice stream to the audience client by the server.

The server can save the live broadcast picture, the virtual activity event stream and the voice stream information, and transmit the live broadcast picture, the virtual activity event stream and the voice stream to the audience client according to the indication information of the audience client. The live broadcast picture, the virtual activity event stream and the voice stream transmitted to the audience client can be forwarded to the audience client immediately after receiving the above information transmitted by the anchor client. It is also possible to transmit a historical live broadcast picture, a virtual activity event stream and a voice stream saved by the server to the audience client.

It is to be understood that, in one implementation, the model data and the model identifier of the live broadcast interactive role can be transmitted in at least one of the live broadcast pictures, the virtual activity event stream and the voice stream.

Step 418a: Determine whether the virtual activity of the first virtual role in the virtual world meets the trigger condition by the anchor client.

Step 418b: Display the live broadcast interactive role performing the first interactive action by the audience client when the trigger condition is met.

It is to be understood that, in order to reduce the amount of data transmitted by the anchor client to the server, it is usually done by the anchor client to determine whether the virtual activity of the first virtual role in the virtual world meets the trigger condition, that is, the virtual activity event stream transmitted by the anchor client to the server only includes a determination result of the trigger condition. However, it is not excluded that the anchor client transmits information that can reflect all of the virtual activity events to the server as the virtual activity event stream, and the audience client determines whether the virtual activity of the first virtual role in the virtual world meets the trigger condition.

Step 420a: Perform voice processing on a voice stream by the anchor client.

Step 420b: Display the mouth opening and closing of the live broadcast interactive role by the audience client.

It is to be understood that, in order to reduce data processing amount of the audience client, the voice processing of the voice stream is usually completed by the anchor client, that is, the anchor client performs the voice processing on the voice stream to obtain the mouth opening and closing of the live broadcast interactive role, and the audience client displays the mouth opening and closing of the live broadcast interactive role. However, it is not excluded that the voice stream is processed by the audience client.

Step 422a: Receive a role interaction operation triggered on the live broadcast interactive role by the audience client.

Step 422b: Display the live broadcast interactive role performing the second interactive action by the audience client.

It is to be understood that, in order to avoid a large amount of data being transmitted by the audience client to the server, the rendering process needed to display the live broadcast interactive role performing the second interactive action is generally completed by the audience client.

To sum up, in the method according to this embodiment, a process of adding the live broadcast interactive role and the anchor user and the audience user interacting with each other through the live broadcast interactive role in the process of webcasting is described in detail, processes of the voice processing, the event processing and the rendering processing are described, which provides a method of connecting the live broadcast interactive role with the first virtual role in the virtual world, and enriches the interaction modes between the anchor user and the audience user in the process of webcasting.

Figure 17:
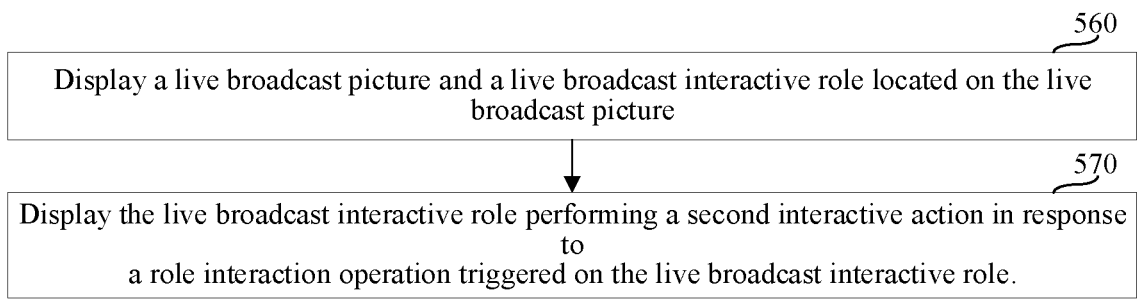
FIG. 17 is a flowchart of a live broadcast interactive method according to an exemplary embodiment of the present application.

FIG. 17 shows a flowchart of a live broadcast interactive method according to an exemplary embodiment of the present application. The method may be executed by a computing device and can be applied to the audience client. This method includes:

Step 560: Display a live broadcast picture and a live broadcast interactive role located on the live broadcast picture.

The live broadcast picture is a live broadcast picture acquired when the anchor account conducts the virtual activity on the first virtual role in the virtual world. For example, the virtual activity described above is a competitive game, that is, the live broadcast picture is a live broadcast picture acquired when the anchor account carries out a competitive game against the first virtual role in the virtual world. It is to be understood that, an account that controls the first virtual role in the virtual world can be the anchor account or other accounts, and other accounts are usually game accounts corresponding to the virtual world. The live broadcast picture is a virtual activity picture acquired by the anchor account.

For example, the live broadcast interactive role is a virtual role generated based on a three-dimensional model. The audience client acquires a three-dimensional model corresponding to the model identifier, and then renders the three-dimensional model based on the model data of the live broadcast interactive role to generate and display a three-dimensional live broadcast interactive role.

When the live broadcast picture and live broadcast interactive role are displayed in the audience client, a display level of the live broadcast interactive role is different from a display level of the live broadcast picture. That is, the live broadcast interactive role can be displayed independently of the live broadcast picture. In this embodiment of the present application, the display level of live broadcast interactive role is usually above a display level of the live broadcast picture, and it can also be described that the display level of the live broadcast interactive role is higher than the display level of the live broadcast picture. However, it is not excluded that the display level of the interactive role is lower than the display level of the live broadcast picture, that is, there may be a case where the display level of the live broadcast interactive role is not higher than the display level of the live broadcast picture. Optionally, the live broadcast picture and the live broadcast interactive role are rendered separately. That is, the live broadcast picture can be independently rendered according to relevant information of the live broadcast picture. According to the relevant information of the live broadcast interactive role, the live broadcast interactive role is rendered separately. However, the above rendering process can be performed at the same time, and no restriction is made on a timing relationship of the rendering processes in this embodiment.

The Live interactive role includes at least one of:
a virtual role set by the anchor account;
a virtual role associated with the first virtual role; and
a virtual role associated with the first virtual role and set by the anchor account.

For example, there are at least three implementations to display the live broadcast interactive role.

Implementation 1 The live broadcast interactive role is set by the anchor client.

For example, the anchor user can set the live broadcast interactive role by logging in the anchor account on the anchor client. That is, the live broadcast picture is displayed, and the live broadcast interactive role located on the live broadcast picture and set by the anchor client is displayed. For example, the anchor client can set a form and/or an interactive action of the live broadcast interactive role.

Implementation 2 The live broadcast interactive role is associated with the first virtual role.

For example, the first virtual role and the live broadcast interactive role have a same or similar role appearance. That is, the live broadcast picture is displayed, and a live broadcast interactive role located on the live broadcast picture and associated with the first virtual role is displayed. Optionally, the interactive action of the live broadcast interactive role is same as or similar to the virtual action of the first virtual role.

For example, a way in which the live broadcast interactive role is associated with the first virtual role includes at least one of: the first virtual role and the live broadcast interactive role having the same or similar appearance; and the interactive action of the live broadcast interactive role being same as or similar to the virtual action of the first virtual role. The first virtual role and the live broadcast interactive role have the similar role appearance, which indicates that the similarity between role appearances of the first virtual role and the live broadcast interactive role is greater than or equal to an appearance similarity threshold. The interactive action of the live broadcast interactive role is similar to an action of the first virtual role, which indicates that similarity between the interactive action of the live broadcast interactive role and the action of the first virtual role is greater than an action similarity threshold.

Implementation 3 The live broadcast interactive role is a virtual role set by the anchor client and associated with the first virtual role.

For example, the live broadcast picture is displayed, and a live broadcast interactive role located on the live broadcast picture, set by the anchor client and associated with the first virtual role is displayed. The first virtual role and the live broadcast interactive role have a same or similar role appearance.

The settings of the live broadcast interactive role can refer to Implementation 1, and an association mode between the live broadcast interactive role and the first virtual role can refer to Implementation 2, which will not be repeatedly described here again.

Step 570: Display the live broadcast interactive role performing the second interactive action in response to a role interaction operation triggered on the live broadcast interactive role.

Optionally, the second interactive action is a three-dimensional interactive action, which includes but is not limited to at least one of:

performing an action conforming to the first posture; such as a waving action, a rolling acting, a hugging and a jumping action;

speaking the first voice; such as speaking a voice message with the content of "mission successful";

playing the first expression; such as a smiling expression, a depressed expression and a crying expression; and changing the position on the live broadcast picture; such as moving from an upper right corner of the live broadcast picture to an upper left corner, and increasing an occupied area of one eighth of an area of the live broadcast picture to an occupied area of a quarter of the area of the live broadcast picture.

It is to be understood that, the live broadcast interactive role is a virtual role based on a three-dimensional model. The three-dimensional model can be a virtual role model with a three-dimensional structure, or it can be a role model that combines multiple two-dimensional models and shows three-dimensional changes by changing shape attributes of the two-dimensional models. The three-dimensional interactive action can control all of the role models of the live broadcast interactive role to act, and can also control a part of the role models of the live broadcast interactive role to act. Three-dimensional interactive actions corresponding to the second interactive action and the first interactive action can be the same or different.

Figure 18:
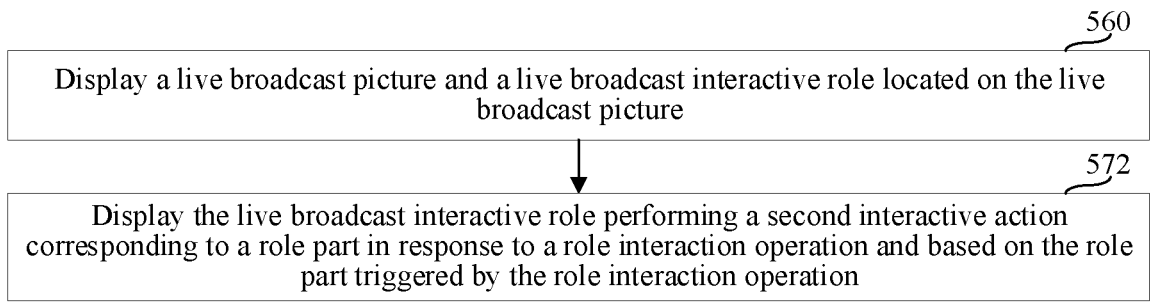
FIG. 18 is a flowchart of a live broadcast interactive method according to an exemplary embodiment of the present application.
Figure 19:
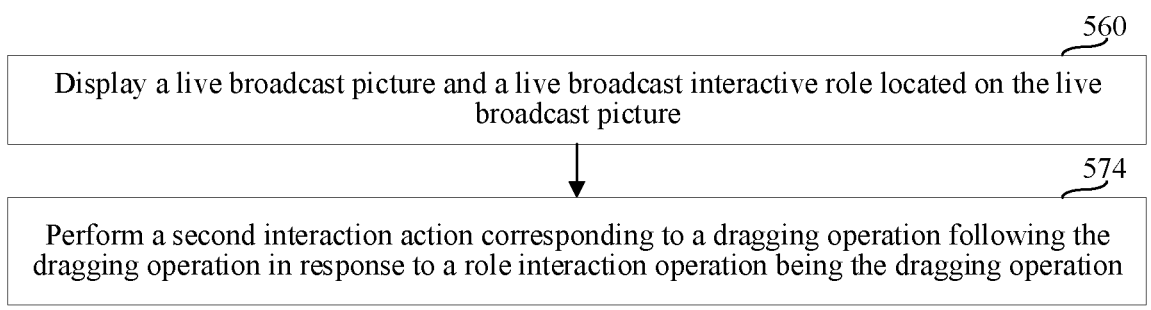
FIG. 19 is a flowchart of a live broadcast interactive method according to an exemplary embodiment of the present application.

Optionally, as shown in FIG. 18 and FIG. 19, Step 570 can be implemented as Step 572 or Step 574.

Step 572: Display the live broadcast interactive role performing the second interactive action corresponding to the role part in response to the role interaction operation and based on the role part triggered by the role interaction operation.

For example, the role part of the live broadcast interactive role corresponds to the second interactive action. For example, if the hand of the live broadcast interactive role is clicked, the live broadcast interactive role performs the waving action. If a body part of the live broadcast interactive role is dragged, the live broadcast interactive role performs a rolling action.

Step 574: Perform the second interaction action corresponding to a dragging operation following the dragging operation in response to the role interaction operation being the dragging operation.

For example, when the role interaction operation is the dragging operation, the live broadcast interactive role changes its position on the live broadcast picture following the dragging operation, and performs the second interaction action corresponding to the dragging operation. For example, the crying expression is played when the role interaction operation is the dragging operation.

It is to be understood that, a performing process of the second interactive action can refer to the performing process of the first interactive action described above, which will not be repeatedly described here again.

To sum up, in the method provided in this embodiment, by adding the live broadcast interactive role, the anchor user can interact with the audience user through a live broadcast interactive role in a process of webcasting. The audience user can directly interact with the live broadcast interactive role through an interactive operation, which enriches interaction modes between the audience user and the anchor user, provides a fast and convenient interactive mode for the audience user, and avoids a tedious text input process for the text comment.

Figure 20:
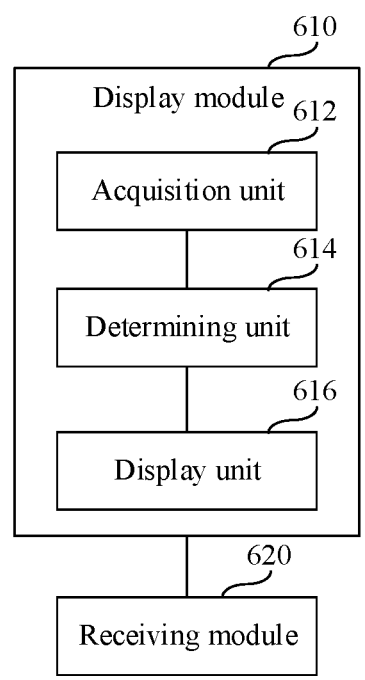
FIG. 20 is a structural block diagram of a live broadcast interactive apparatus according to an exemplary embodiment of the present application.

FIG. 20 is a block diagram of a live broadcast interactive apparatus according to an embodiment of the present application. The apparatus includes:

a display module 610 configured to display a live broadcast picture and a live broadcast interactive role located on the live broadcast picture, the live broadcast picture being a live broadcast picture acquired when an anchor account conducts a virtual activity on the first virtual role in a virtual world, a display level of the live broadcast interactive role being different from a display level of the live broadcast picture; and the display module 610 being further configured to display the live broadcast interactive role performing the first interactive action in response to the virtual activity of the first virtual role in the virtual world meeting a trigger condition.

In an alternative design of this embodiment, the display module 610 is further configured for at least one of:

displaying the live broadcast interactive role performing the first interactive action in response to an activity of the first virtual role eliminating the second virtual role in the virtual world meeting the first trigger condition;

displaying the live broadcast interactive role performing the first interactive action in response to an activity of the first virtual role being eliminated by the third virtual role in the virtual world meeting the second trigger condition; and displaying the live broadcast interactive role performing the first interactive action in response to an activity of the first virtual role completing the first task in the virtual world meeting a third trigger condition.

In an alternative design of this embodiment, the live broadcast interactive role is a virtual role based on a three-dimensional model, and the first interactive action is a three-dimensional interactive action. The display module 610 is further configured to:

display the live broadcast interactive role performing a three-dimensional interactive action corresponding to the trigger condition, and the three-dimensional interactive action includes at least one of the following actions: performing an action conforming to the first posture; speaking the first voice; playing the first expression; and changing a position on the live broadcast picture.

In an alternative design of this embodiment, the apparatus further includes:

a receiving module 620 further configured to receive a virtual activity event stream from the anchor client, the virtual activity event stream carrying event information of the virtual activity; and the display module 610 further configured to display the live broadcast interactive role performing the first interactive action when the event information of the virtual activity meets the trigger condition.

In an alternative design of this embodiment, the display module 610 is further configured to:

display the live broadcast picture and display the live broadcast interactive role located on the live broadcast picture and set by the anchor client, or display the live broadcast picture and display a live broadcast interactive role located on the live broadcast picture and associated with the first virtual role, the first virtual role and the live broadcast interactive role having a same or similar role appearance; or display the live broadcast picture and display a live broadcast interactive role located on the live broadcast picture, set by the anchor client and associated with the first virtual role, the first virtual role and the live broadcast interactive role having a same or similar role appearance.

In an alternative design of this embodiment, the receiving module 620 is further configured to receive a role interaction operation triggered on the live broadcast interactive role.

The display module 610 is further configured to display the live broadcast interactive role performing the second interactive action in response to the role interaction operation.

In an alternative design of this embodiment, the display module 610 is further configured to:

display the live broadcast interactive role performing the second interactive action corresponding to the role part in response to the role interaction operation and based on the role part triggered by the role interaction operation.

In an alternative design of this embodiment, the display module 610 is further configured to:

perform the second interaction action corresponding to a dragging operation following the dragging operation in response to the role interaction operation being the dragging operation.

In an alternative design of this embodiment, the display module 610 is further configured to:

display mouth opening and closing of the live broadcast interactive role based on a voice stream of the anchor account.

In an alternative design of this embodiment, the first display module 610 includes:

an acquisition unit 612, configured to acquire pitch information of the voice stream of the anchor account;

a determining unit 614, configured to determine the mouth shape of the live broadcast interactive role according to the pitch information;

a display unit 616, configured to display the mouth opening and closing of the live broadcast interactive role based on the mouth shape of the live broadcast interactive role.

In an alternative design of this embodiment, in this embodiment, the determining unit is further configured to:

calculate periodically a sum of pitch information in the first period;

determine the first pitch threshold interval corresponding to the sum of the pitch information among n pitch threshold intervals; and query a mouth shape corresponding to the first pitch threshold interval in a mouth shape correspondence as the mouth shape of the live broadcast interactive role; and the mouth shape correspondence including correspondences between the n pitch threshold intervals and m mouth shapes.

Figure 21:
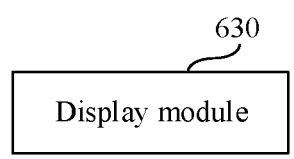
FIG. 21 is a structural block diagram of a live broadcast interactive apparatus according to an exemplary embodiment of the present application.

FIG. 21 is a block diagram of a live broadcast interactive apparatus according to an embodiment of the present application. The apparatus includes:

a display module 630 configured to display a live broadcast picture and a live broadcast interactive role located on the live broadcast picture, the live broadcast picture being a live broadcast picture acquired when an anchor account carries out a competitive game against the first virtual role in a virtual world, the live broadcast interactive role including at least one of: a virtual role set by the anchor account, a virtual role associated with the first virtual role, and a virtual role associated with the first virtual role set by the anchor account; and the display module 630 being further configured to display the live broadcast interactive role performing the second interactive action in response to a role interaction operation triggered on the live broadcast interactive role.

In an alternative design of this embodiment, the display module 630 is further configured to:

display the live broadcast interactive role performing the second interactive action corresponding to the role part in response to the role interaction operation and based on the role part triggered by the role interaction operation.

In an alternative design of this embodiment, the display module 630 is further configured to:

perform the second interaction action corresponding to a dragging operation following the dragging operation in response to the role interaction operation being the dragging operation.

In an alternative design of this embodiment, the live broadcast interactive role is a virtual role based on a three-dimensional model, and the second interactive action is a three-dimensional interactive action, and the three-dimensional interactive action includes at least one of the following actions: performing an action conforming to the first posture; speaking the first voice; playing the first expression; and changing a position on the live broadcast picture.

A computer device is further provided in an embodiment of this application, which includes: a processor and a memory, the memory storing at least one instruction, at least one program, and a code set or an instruction set, and the at least one instruction, the at least one program, the code set or the instruction set being loaded and executed by the processor to implement the live broadcast interactive method as described in the above respective method embodiments.

Figure 22:
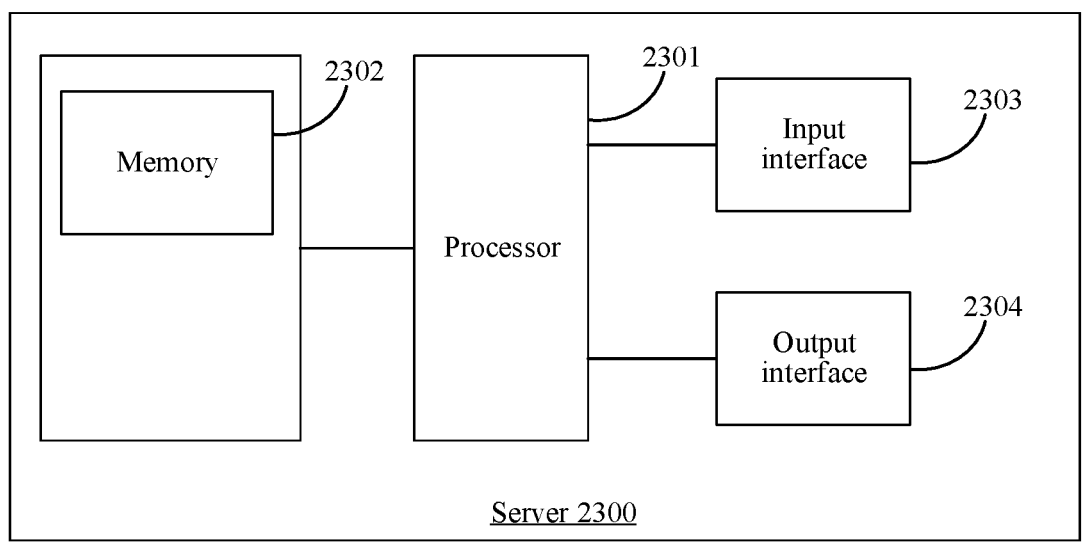
FIG. 22 is a schematic structural diagram of a server according to an exemplary embodiment of this application.

The computer device may be a terminal or a server. For example, in this embodiment, an example in which the computer device is the server is taken for description. FIG. 22 is a schematic structural diagram of a server according to an exemplary embodiment of this application.

Generally, the server 2300 includes: a processor 2301 and a memory 2302.

The processor 2301 may include one or more processing cores, for example, a 4-core processor or an 8-core processor. The processor 2301 may be implemented in at least one hardware form of a digital signal processor (DSP), a field-programmable gate array (FPGA), and a programmable logic array (PLA). The processor 2301 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2301 may be integrated with a graphics processing unit (GPU). The GPU is configured to render and draw content that needs to be displayed on a display screen. In some embodiments, the processor 2301 may further include an artificial intelligence (AI) processor. The AI processor is configured to process computing operations related to machine learning.

The memory 2302 may include one or more computer-readable storage media. The computer-readable storage medium may be non-transient. The memory 2302 may further include a high-speed random access memory and a nonvolatile memory, for example, one or more disk storage devices or flash storage devices. In some embodiments, the non-transitory computer-readable storage medium in the memory 2302 is configured to store at least one instruction, and the at least one instruction being configured to be executed by the processor 2301 to implement a method for tracking video data provided in the method embodiments of this application.

In some embodiments, the server 2300 further includes: an input interface 2303 and an output interface 2304. The processor 2301, the memory 2302, and the input interface 2303 and the output interface 2304 may be connected through a bus or a signal cable. Respective peripheral devices may be connected to the input interface 2303 and the output interface 2304 through a bus, a signal cable, or a circuit board. The input interface 2303 and the output interface 2304 may be configured to connect the at least one peripheral device related to input/output (I/O) to the processor 2301 and the memory 2302. In some embodiments, the processor 2301, the memory 2302, the input interface 2303 and the output interface 2304 are integrated on the same chip or circuit board. In some other embodiments, any one or two of the processor 2301, the memory 2302, the input interface 2303 and the output interface 2304 can be implemented on a separate chip or circuit board, which is not limited in this embodiment of the present application.

A person skilled in the art may understand that the above structure constitutes no limitation on the server 2300, and the server may include more or fewer components than those shown in the figure, or some components may be combined, or a different component deployment may be used. For example, in this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

In an exemplary embodiment, a chip is also provided, which includes a programmable logic circuit and/or program instructions, and when the chip runs on a computer device, it is used to realize the live broadcast interactive method described in the above aspects.

In an exemplary embodiment, a computer program product or computer program is further provided, which includes computer instructions stored in a non-transitory computer-readable storage medium. The processor of the computer device reads the computer instruction from the computer-readable storage medium, and the processor executes the computer instruction, so that the computer device executes the live broadcast interactive method according to the above method embodiments.

In an exemplary embodiment, a non-transitory computer-readable storage medium is further provided. The computer-readable storage medium stores at least one program code, which, when loaded and executed by a processor of a computer device, implements the live broadcast interactive method according to the above method embodiments.

A person of ordinary skill in the art may understand that all or some of the steps of the foregoing embodiments may be implemented in hardware, or may be implemented by a program instructing relevant hardware. The program may be stored in a non-transitory computer-readable storage medium. The storage medium may be a read-only memory, a magnetic disk, an optical disc, or the like.

What is claimed is:

1. A live broadcast interactive method performed by a computer device, the method comprising:
   displaying a live broadcast, video acquired when an anchor user conducts a virtual activity on a first virtual avatar in a virtual world;
   displaying, at a display level different from the live broadcast video, a live broadcast interactive avatar generated from a three-dimensional model in the virtual world;
   displaying the live broadcast interactive avatar performing a first interactive action in response to the virtual activity of the first virtual avatar in the virtual world meeting a trigger condition; and
   displaying, the live broadcast interactive avatar performing a second interactive action in response to an audience interaction operation by an audience user, the audience interaction operation including at least one of:
   (a) a clicking operation on an avatar part of the live broadcast interactive avatar causing the live broadcast interactive avatar to wave;

(b) a dragging operation on the live broadcast interactive avatar causing the live broadcast interactive avatar to move position and display an expression; and
(c) a dialog operation including text or voice input causing the live broadcast interactive avatar to reply with synchronized mouth movements of the three-dimensional model.

2. The method according to claim 1, wherein the displaying the live broadcast interactive avatar performing the first interactive action in response to the virtual activity of the first virtual avatar in the virtual world meeting the trigger condition comprises at least one of:
displaying the live broadcast interactive avatar performing the first interactive action in response to an activity of the first virtual avatar eliminating a second virtual avatar in the virtual world meeting a first trigger condition;
displaying the live broadcast interactive avatar performing the first interactive action in response to an activity of the first virtual avatar being eliminated by the third virtual avatar in the virtual world meeting a second trigger condition; and
displaying the live broadcast interactive avatar performing the first interactive action in response to an activity of the first virtual avatar completing the first task in the virtual world meeting a third trigger condition.

3. The method according to claim 1, wherein nd the first interactive action is a three-dimensional interactive action, and the displaying the live broadcast interactive avatar performing the first interactive action comprises:
displaying the live broadcast interactive avatar performing a three-dimensional interactive action corresponding to the trigger condition, and the three-dimensional interactive action comprises at least one of the following actions:
performing an action conforming to a first posture;
speaking a first voice;
playing a first expression; and
changing a position on the live broadcast picture video.

4. The method according to claim 1, further comprising:
receiving a virtual activity event stream from an anchor client, the virtual activity event stream carrying event information of the virtual activity; and
displaying the live broadcast interactive avatar performing the first interactive action when the event information of the virtual activity meets the trigger condition.

5. The method according to claim 1, further comprising:
displaying mouth opening and closing of the live broadcast interactive avatar based on a voice stream of the anchor user.

6. A computer device, comprising: a processor and a memory, the memory storing at least one program; and the processor being configured to execute the at least one program in the memory to implement a live broadcast interactive method including:
displaying a live broadcast, video acquired when an anchor user conducts a virtual activity on a first virtual avatar in a virtual world;
displaying, at a display level different from the live broadcast video, a live broadcast interactive avatar generated from a three-dimensional model in the virtual world;
displaying the live broadcast interactive avatar performing a first interactive action in response to the virtual activity of the first virtual avatar in the virtual world meeting a trigger condition; and
displaying, the live broadcast interactive avatar performing a second interactive action in response to an audience interaction operation by an audience user, the audience interaction operation including at least one of:
(a) a clicking operation on an avatar part of the live broadcast interactive avatar causing the live broadcast interactive avatar to wave;
(b) a dragging operation on the live broadcast interactive avatar causing the live broadcast interactive avatar to move position and display an expression; and
(c) a dialog operation including text or voice input causing the live broadcast interactive avatar to reply with synchronized mouth movements of the three-dimensional model.

7. The computer device according to claim 6, wherein the displaying the live broadcast interactive avatar performing the first interactive action in response to the virtual activity of the first virtual role-avatar in the virtual world meeting the trigger condition comprises at least one of:
displaying the live broadcast interactive avatar performing the first interactive action in response to an activity of the first virtual avatar eliminating a second virtual avatar in the virtual world meeting a first trigger condition;
displaying the live broadcast interactive avatar performing the first interactive action in response to an activity of the first virtual avatar being eliminated by the third virtual avatar in the virtual world meeting a second trigger condition; and
displaying the live broadcast interactive avatar performing the first interactive action in response to an activity of the first virtual avatar completing the first task in the virtual world meeting a third trigger condition.

8. The computer device according to claim 6, the first interactive action is a three-dimensional interactive action, and the displaying the live broadcast interactive avatar performing the first interactive action comprises:
displaying the live broadcast interactive avatar performing a three-dimensional interactive action corresponding to the trigger condition, and the three-dimensional interactive action comprises at least one of the following actions:
performing an action conforming to a first posture;
speaking a first voice;
playing a first expression; and
changing a position on the live broadcast picture video.

9. The computer device according to claim 6, wherein the method further comprises:
receiving a virtual activity event stream from an anchor client, the virtual activity event stream carrying event information of the virtual activity; and
displaying the live broadcast interactive avatar performing the first interactive action when the event information of the virtual activity meets the trigger condition.

10. The computer device according to claim 6, wherein the method further comprises:
displaying mouth opening and closing of the live broadcast interactive avatar based on a voice stream of the anchor user.

11. A non-transitory computer readable storage medium, storing executable instructions, the executable instructions, when loaded and executed by a processor of a computer device, causing the computer device to implement a live broadcast interactive method including:
displaying a live broadcast, video acquired when an anchor user conducts a virtual activity on a first virtual avatar in a virtual world;

displaying, at a display level different from the live broadcast video, a live broadcast interactive avatar generated from a three-dimensional model in the virtual world;

displaying the live broadcast interactive avatar performing a first interactive action in response to the virtual activity of the first virtual avatar in the virtual world meeting a trigger condition, and displaying, the live broadcast interactive avatar performing a second interactive action in response to an audience interaction operation by an audience user, the audience interaction operation including at least one of:

(a) a clicking operation on an avatar part of the live broadcast interactive avatar causing the live broadcast interactive avatar to wave;

(b) a dragging operation on the live broadcast interactive avatar causing the live broadcast interactive avatar to move position and display an expression; and (c) a dialog operation including text or voice input causing the live broadcast interactive avatar to reply with synchronized mouth movements of the three-dimensional model.

12. The non-transitory computer readable storage medium according to claim 11, wherein the displaying the live broadcast interactive avatar performing the first interactive action in response to the virtual activity of the first virtual avatar in the virtual world meeting the trigger condition comprises at least one of:

displaying the live broadcast interactive avatar performing the first interactive action in response to an activity of the first virtual avatar eliminating a second virtual avatar in the virtual world meeting a first trigger condition;

displaying the live broadcast interactive avatar performing the first interactive action in response to an activity of the first virtual avatar being eliminated by the third virtual avatar in the virtual world meeting a second trigger condition; and displaying the live broadcast interactive avatar performing the first interactive action in response to an activity of the first virtual avatar completing the first task in the virtual world meeting a third trigger condition.

13. The non-transitory computer readable storage medium according to claim 11, wherein the first interactive action is a three-dimensional interactive action, and the displaying the live broadcast interactive avatar performing the first interactive action comprises:

displaying the live broadcast interactive avatar performing a three-dimensional interactive action corresponding to the trigger condition, and the three-dimensional interactive action comprises at least one of the following actions:

performing an action conforming to a first posture;

speaking a first voice;

playing a first expression; and changing a position on the live broadcast picture video.

14. The non-transitory computer readable storage medium according to claim 11, wherein the method further comprises:

receiving a virtual activity event stream from an anchor client, the virtual activity event stream carrying event information of the virtual activity; and displaying the live broadcast interactive avatar performing the first interactive action when the event information of the virtual activity meets the trigger condition.

* * * * *